(12) United States Patent
Okada

(10) Patent No.: US 8,385,607 B2
(45) Date of Patent: Feb. 26, 2013

(54) IMAGING APPARATUS, IMAGE PROCESSING APPARATUS, IMAGE PROCESSING METHOD AND COMPUTER PROGRAM

(75) Inventor: Miyuki Okada, Kanagawa (JP)

(73) Assignee: Sony Corporation, Tokyo (JP)

( * ) Notice: Subject to any disclaimer, the term of this patent is extended or adjusted under 35 U.S.C. 154(b) by 1193 days.

(21) Appl. No.: 11/869,391

(22) Filed: Oct. 9, 2007

(65) Prior Publication Data

US 2008/0118156 A1 May 22, 2008

(30) Foreign Application Priority Data

Nov. 21, 2006 (JP) ................... 2006-314891

(51) Int. Cl.
*G06K 9/00* (2006.01)
(52) U.S. Cl. .................... 382/118; 348/333.02
(58) Field of Classification Search .................. 382/118; 348/333.02, 333.03
See application file for complete search history.

(56) References Cited

U.S. PATENT DOCUMENTS

| | | | |
|---|---|---|---|
| 7,127,081 | B1 | 10/2006 | Erdem |
| 7,995,804 | B2 * | 8/2011 | Steinberg et al. ............ 382/117 |
| 2002/0080272 | A1 | 6/2002 | Nakamura et al. ............ 348/473 |
| 2004/0131278 | A1 * | 7/2004 | Imagawa et al. ............ 382/284 |
| 2005/0219393 | A1 * | 10/2005 | Sugimoto ............... 348/333.01 |
| 2005/0219395 | A1 * | 10/2005 | Sugimoto ............... 348/333.12 |
| 2005/0226534 | A1 * | 10/2005 | Moroo et al. ............... 382/291 |
| 2006/0161588 | A1 * | 7/2006 | Nomoto ................. 707/104.1 |
| 2007/0076960 | A1 * | 4/2007 | Takamori et al. ............ 382/224 |
| 2007/0222797 | A1 * | 9/2007 | Misawa et al. ............... 345/629 |
| 2007/0266312 | A1 * | 11/2007 | Ayaki et al. ................ 715/526 |
| 2008/0008361 | A1 * | 1/2008 | Nozaki et al. .............. 382/118 |
| 2008/0024616 | A1 * | 1/2008 | Takahashi ................. 348/221.1 |
| 2008/0050022 | A1 * | 2/2008 | Okada et al. ............... 382/209 |
| 2010/0194962 | A1 * | 8/2010 | Kato ..................... 348/333.05 |

FOREIGN PATENT DOCUMENTS

| | | |
|---|---|---|
| CN | 1427292 A | 7/2003 |
| CN | 1635539 A | 7/2005 |
| CN | 1764238 A | 4/2006 |
| CN | 1794265 A | 6/2006 |
| JP | 3-222582 | 10/1991 |
| JP | 2001-255455 | 9/2001 |
| JP | 2004-5384 | 1/2004 |
| JP | 2004-295001 | 10/2004 |
| JP | 2004-320287 | 11/2004 |
| JP | 2005-20446 | 1/2005 |
| JP | 2005-39424 | 2/2005 |
| JP | 2005-286940 | 10/2005 |
| JP | 2005-294917 | 10/2005 |

OTHER PUBLICATIONS

U.S. Appl. No. 12/541,477, filed Aug. 14, 2009, Okada. Chinese Office Action issued Oct. 24, 2008 in Chinese Patent Application 200710188655.6 (with English translation).

* cited by examiner

*Primary Examiner* — Jon Chang
(74) *Attorney, Agent, or Firm* — Oblon, Spivak, McClelland, Maier & Neustadt, L.L.P.

(57) ABSTRACT

An imaging apparatus includes an image pickup unit for capturing an image of a subject, an image input unit for inputting the image captured by the image pickup unit, a face detecting unit for detecting a face from the image input by the image input unit, a face position marker generating unit for generating a face position marker indicating a position of the face, detected by the face detecting unit, in the image input by the image input unit, an overlaying unit for overlaying the face position marker generated by the face position marker generating unit and the image input by the image input unit, and a display unit for displaying an image overlaid by the overlaying unit.

22 Claims, 18 Drawing Sheets

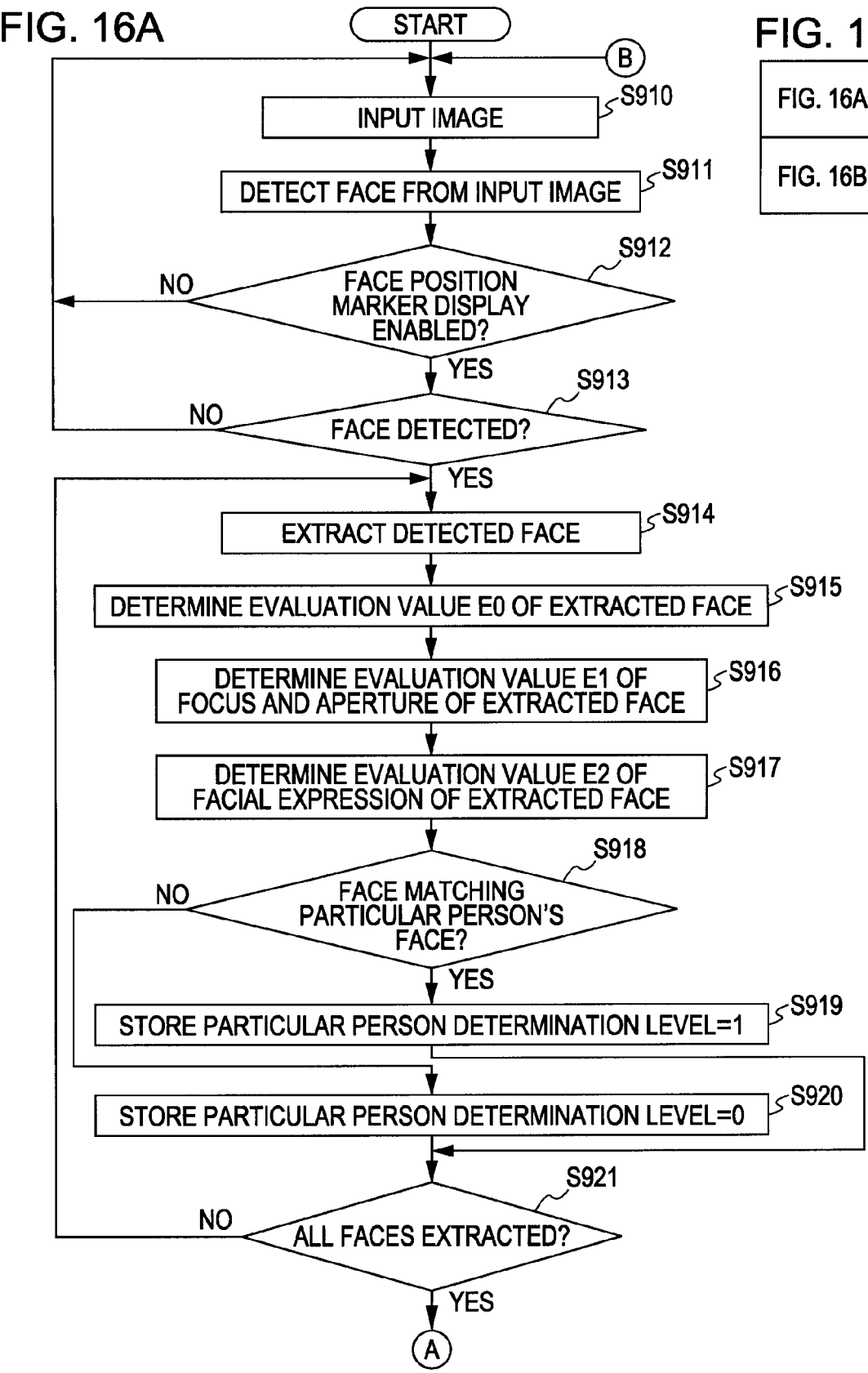

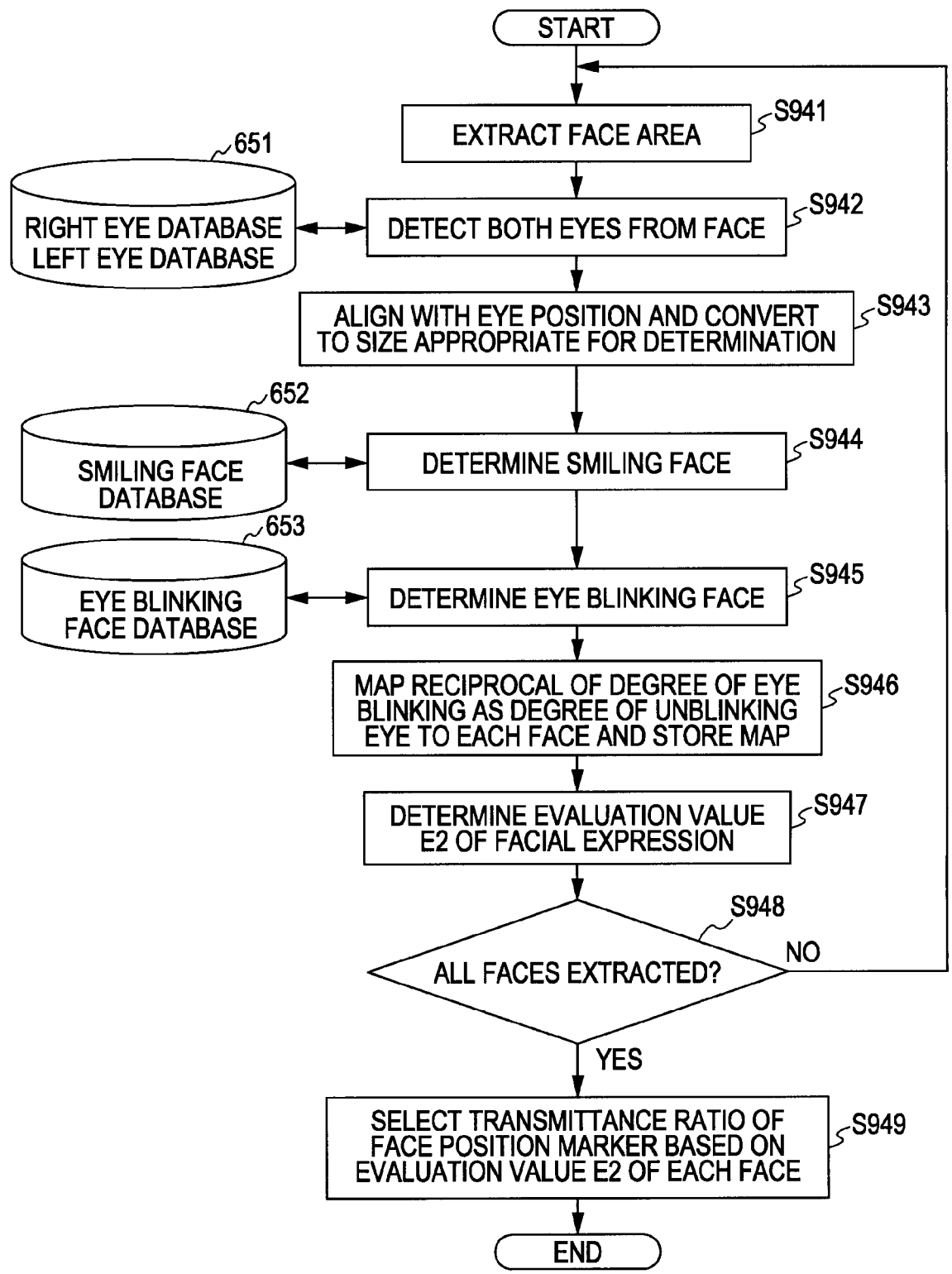

IMAGING APPARATUS, IMAGE PROCESSING APPARATUS, IMAGE PROCESSING METHOD AND COMPUTER PROGRAM

CROSS REFERENCES TO RELATED APPLICATIONS

The present invention contains subject matter related to Japanese Patent Application JP 2006-314891 filed in the Japanese Patent Office on Nov. 21, 2006, the entire contents of which are incorporated herein by reference.

BACKGROUND OF THE INVENTION

1. Field of the Invention

The present invention relates to an imaging apparatus and, in particular, to an imaging apparatus, an image processing apparatus, an image processing method and a computer program for displaying a position of a face appearing in an image.

2. Description of the Related Art

Imaging apparatuses, such as digital still cameras and digital video cameras, and imaging apparatuses as a digital still/moving image camera are rapidly and increasingly used. Performance of such imaging apparatuses is heightened.

Typical function of the imaging apparatus is a face detecting function. The face detecting function is to detect a face of a person from a captured image. Since a face area of a person is detected from the captured image, the face detection function can be widely used in a variety of applications such as auto focus (AF) function, auto exposure (AE) control function, an auto white balance function and image incidental data.

Japanese Unexamined Patent Application Publication No. 2004-5384 discloses an image processing method. In accordance with the disclosed method, an area of skin color may be detected from the image, and positions of feature points such as the mouth, the eyes, etc. of the person are detected based on the skin color area. Based on the skin color area and the positions of the feature points, it is then determined whether the skin color area is a face area.

SUMMARY OF THE INVENTION

The face area of each person can be detected from a photographed image in accordance with the known art. Furthermore, using face recognition technique, a variety of values may be extracted from the detected face area. The variety of values may include the size of the area of a face, the position of the face, and the likelihood of face. The state of part of the face, such as a smiling face, facial expression, blinking eyes, etc. may also be determined from the detected face area.

Using the face recognition technique, a variety of information relating to face may be extracted from the photographed image. If a user can recognize a variety of information relating to face detected from the photographed image using the face recognition technique with an imaging apparatus, the imaging apparatus becomes more useful. Image capturing is thus quickly performed.

It is desirable to help the user to easily recognize a face detected from an image together with a variety of information relating to the detected face. It is also desirable to provide a convenient user interface based on the face recognition technique.

In accordance with one embodiment of the present invention, an imaging apparatus includes an image pickup unit for capturing an image of a subject, an image input unit for inputting the image captured by the image pickup unit, a face detecting unit for detecting a face from the image input by the image input unit, a face position marker generating unit for generating a face position marker indicating a position of the face, detected by the face detecting unit, in the image input by the image input unit, an overlaying unit for overlaying the face position marker generated by the face position marker generating unit and the image input by the image input unit, and a display unit for displaying an image overlaid by the overlaying unit.

The imaging apparatus may further include a setting unit for setting whether to generate the face position marker with the face position marker generating unit. The imaging apparatus thus sets whether to generate the face position marker and then allows a user to determine whether to display the face position marker.

The face position marker may be composed of one of a rectangular shape, an ellipsoidal shape, and a group of four points only at the four corners of a rectangular shape. The face position marker may be display in one of a rectangular shape, an ellipsoidal shape, and a group of four points only at the four corners of a rectangular shape.

The face position marker generating unit may generate the face position marker so that the face position marker is placed around the face detected by the face detecting unit in the image input by the image input unit. With this arrangement, the face position marker may be placed around the face detected by the face detecting unit in the input image.

The face position marker generating unit may generate the face position marker so that the face position marker is placed to surround the face detected by the face detecting unit in the image input by the image input unit. With this arrangement, the face position marker is placed to surround the face in the image input by the input image.

If a plurality of faces are detected by the face detecting unit in the image input by the image input unit, the face position marker generating unit may generate the face position marker so that the detected faces are different from each other in terms of one of color of the face position marker, a type of a line of the face position marker, a thickness of the line of the face position marker, a transparency of the face position marker, a blinking state of the face position marker, and one of luminance and color of an internal area surrounded by an outline of the face position marker.

The display unit may display one of an internal area and an external area of an outline of the face position marker with one of luminance and color thereof modified in the image overlaid by the overlaying unit. With this arrangement, one of the internal area and the external area of the outline of the face position marker is displayed with one of luminance and color thereof modified in the overlaid image.

The face detecting unit may detect a variety of information relating to the face detected in the image input by the image input unit, and the face position marker generating unit may generate the face position marker of the face based on the variety of information relating to the face detected by the face detecting unit. The variety of information relating to the face is detected in the input image, and the face position marker of the face is generated based on the variety of information relating to the detected face. The variety of information relating to the face may include an area of the face, coordinates of the area of the face, a value of likelihood of face, the degree of full face alignment, a tilt of the face, the degree of smiling of the face, the degree of seriousness of the face, and the degree of closed-eyed face, alone or in combination. The face position marker is thus generated based on the area of the face, the coordinates of the area of the face, the value of likelihood of face, the degree of full face alignment, the tilt of the face, the degree of smiling of the face, the degree of seriousness of the face, and the degree of closed-eyed face, alone or in combination.

The face position marker generating unit may modify a transparency of the face position marker of the face based on the variety of information relating to the face detected by the face detecting unit. The transparency of the face position marker of the face is thus successively modified based on the variety of information relating to the detected face.

The imaging apparatus may further include a camera control value detecting unit for detecting one of the degree of focusing to the face and the degree of lens exposure matching based on the variety of information relating to the face detected by the face detecting unit. The face position marker generating unit generates the face position marker based on the one of the degree of focusing to the face and the degree of lens exposure matching relating to the face detected by the camera control value detecting unit. With this arrangement, one of the degree of focusing to the face and the degree of lens exposure matching is detected based on the variety of information relating to the detected face. The face position marker is generated based on the one of the degree of focusing to the face and the degree of lens exposure matching relating to the detected face.

The imaging apparatus may further include a major person estimating unit for estimating a major person from the plurality of detected faces from among the variety of information relating to the face if the plurality of faces are detected by the face detecting unit from the image input by the image input unit. The face position marker generating unit may generate each face position marker in the form permitting the face position marker of the major person estimated by the major person estimating unit to be discriminated from the face position markers of the other persons. If the plurality of faces are detected from the input image, the major person is estimated from the plurality of detected faces. The face position markers are generated in the form permitting the face position marker of the major person estimated by the major person estimating unit to be discriminated from the face position markers of the other persons.

The imaging apparatus may further include a particular person storage unit for storing particular person information relating to a face of a particular person, and a particular person determining unit for determining whether a face detected by the face detecting unit matches the face of the particular person stored on the particular person storage unit. It is thus determined whether the detected face matches the face of the particular person. If it is determined that the detected face matches the face of the particular person, the face position markers are generated in the form permitting the face position marker of the particular person to be discriminated from the face position markers of the other persons.

The face position marker generating unit may generate a face looking direction marker in the vicinity of the face position marker of the face in response to a direction and an angle of the face if the face detected by the face detecting unit looks in one of an upward direction, a downward direction, a leftward direction and a rightward direction, and the overlaying unit may overlay the face position marker, generated by the face position marker generating unit, and the face looking direction marker on the image input by the image input unit. If the detected face looks in one of the upward direction, the downward direction, the leftward direction and the rightward direction, the face looking direction marker in the vicinity of the face position marker of the face in response to the direction and the angle of the face is generated. The generated face position marker and the face looking direction marker are overlaid on the input image.

The face position marker generating unit may generate a face tilt marker to be displayed in the vicinity of the face position marker of the face in response to a tilt angle if the face detected by the face detecting unit is tilted as a result of a rolling action, and the overlaying unit may overlay the face position marker and the face tilt marker, generated by the face position marker generating unit, on the image input by the image input unit. If the detected face is tilted as a result of a rolling action, a face tilt marker to be displayed in the vicinity of the face position marker of the face in response to a tilt angle is generated. The generated face position marker and face tilt marker are overlaid on the input image. The rolling action means an action of rolling of the face about an fore-aft axis of the face.

The face position marker generating unit may generate a particular position marker as a face position marker indicating one of an upper position, a lower position, a left position and a right position in the face detected by the face detecting unit, and the overlaying unit may overlay the particular position marker generated by the face position marker generating unit on the image input by the image input unit. With this arrangement, the particular position marker indicating one of the upper position, the lower position, the left position and the right position in the detected face is generated. The generated particular position marker is overlaid on the input image.

The face position marker generating unit may generate a particular position marker as a face position marker indicating one of an upper position, a lower position, a left position and a right position in the face detected by the face detecting unit, the particular position marker being displayed on or in the vicinity of the face position marker, and the overlaying unit overlays the face position marker and the particular position marker, generated by the face position marker generating unit, on the image input by the image input unit. With this arrangement, the particular position marker indicating one of the upper position, the lower position, the left position and the right position in the detected face is generated. The face position marker and the particular position marker are overlaid on the input image. The particular position marker is thus displayed on or in the vicinity of the face position marker.

The imaging apparatus may further include an image pickup status detecting unit for detecting an image pickup status with a portrait view angle, based on the particular position marker generated by the face position marker generating unit. If the image pickup status detecting unit has detected the image pickup status with a portrait view angle, the display unit displays an indication indicating that the image pickup status with a portrait view angle has been detected, together with the particular position marker generated by the face position marker generating unit in the image overlaid by the overlaying unit. With this arrangement, the image pickup status with a portrait view angle is detected based on the particular position marker. The particular position marker thus displays the indication indicating the image pickup status with a portrait view angle together with the overlaid image.

The imaging apparatus may further includes an output unit for outputting image incidental information indicating that the image pickup status with a portrait view angle has been detected, together with the image overlaid by the overlaying unit, if the image pickup status detecting unit has detected the image pickup status with a portrait view angle. The image incidental information indicating that the image pickup status with a portrait view angle is output together with the overlaid image to a recording medium.

The imaging apparatus may further include a selecting unit for selecting a face of a desired person from among a plurality of faces if the display unit displays the plurality of faces, detected by the face detecting unit, together with face position markers corresponding to the plurality of faces, and the face position marker generating unit may generate each face position marker in the form permitting the face position marker of the face of the person selected by the selecting unit to be discriminated from the face position markers of the other persons. If the plurality of faces are displayed together with face position markers corresponding to the plurality of faces, the face of the desired person is selected from among the plurality of faces. Each face position marker is generated and displayed in the form permitting the face position marker of the face of the selected person to be discriminated from the face position markers of the other persons.

In accordance with one embodiment of the present invention, an image processing apparatus includes an image input unit for inputting an image, a face detecting unit for detecting a face from the image input by the image input unit, a face position marker generating unit for generating a face position marker indicating a position of the face, detected by the face detecting unit, in the image input by the image input unit, an overlaying unit for overlaying the face position marker generated by the face position marker generating unit and the image input by the image input unit, and an output unit for outputting an image overlaid by the overlaying unit. In accordance with one embodiment of the present invention, one of an image processing method and a computer program includes inputting an image, detecting a face from the image input in the image input step, generating a face position marker indicating a position of the face, detected in the face detecting step, in the image received in the image input step, overlaying the face position marker generated in the face position marker generating step and the image received in the image input step, and outputting an image overlaid in the overlaying step.

In accordance with embodiments of the present invention, the user can easily recognize the face detected from the image together with the variety of information relating to the face.

BRIEF DESCRIPTION OF THE DRAWINGS

FIG. 16A is a flowchart illustrating a face position marker display process performed by the imaging apparatus;

FIG. 17 is a flowchart illustrating a selection process of selecting a transparency of the face position marker by the imaging apparatus.

DESCRIPTION OF THE PREFERRED EMBODIMENTS

The embodiments of the present invention are described below with reference to the drawings.

Figure 1:
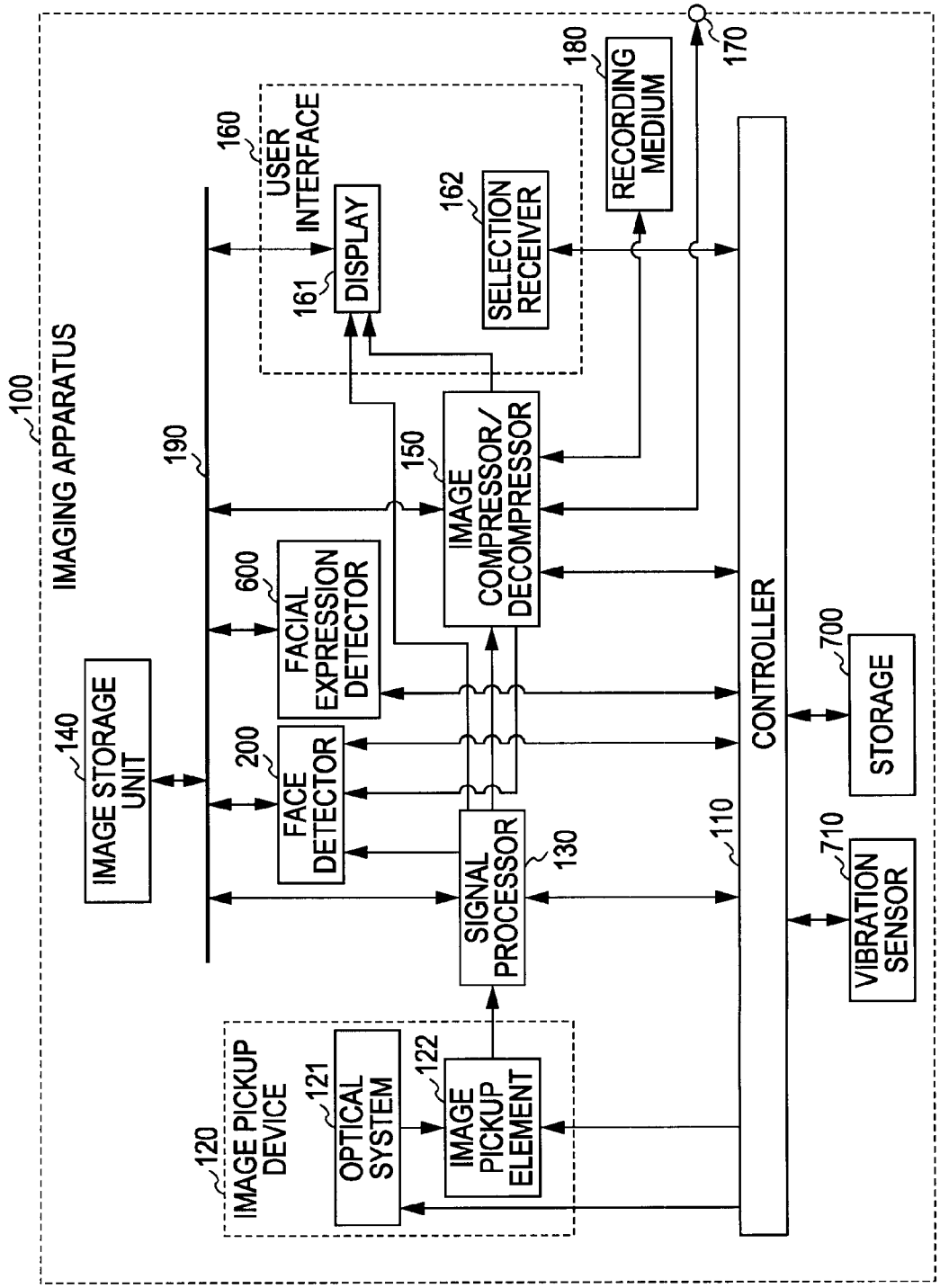
FIG. 1 is a functional block diagram illustrating an imaging apparatus in accordance with one embodiment of the present invention.

FIG. 1 is a functional block diagram illustrating an imaging apparatus 100 in accordance with one embodiment of the present invention. The imaging apparatus 100 may be one of an image capturing device such as a digital still camera or a digital video camera, and an image capturing device such as a camera attached to a terminal such as a cell phone or a personal computer.

The imaging apparatus 100 includes a controller 110, an image pickup device 120, a signal processor 130, an image storage unit 140, an image compressor/decompressor 150, a user interface 160, an input-output terminal 170, a recording medium 180, a bus 190, a face detector 200, a facial expression detector 600, a storage 700, and a vibration sensor 710. Image signal may be exchanged between elements directly or via the image storage unit 140 or the bus 190.

The controller 110 controls each elements in the imaging apparatus 100 in accordance with a variety of control programs stored on a memory (not shown).

The image pickup device 120, including an optical system 121 and an image pickup element 122, photoelectrically converts incident light from a subject into an electrical signal, and outputs the resulting electrical signal to the signal processor 130. The optical system 121, including a group of lenses, such as a focusing lens and a zoom lens, outputs the light incident via the lens group from the subject to the image pickup element 122. The image pickup element 122 photoelectrically converts the incident light output from the optical system 121 into the electrical signal, and outputs the resulting the electrical signal to the signal processor 130.

The signal processor 130 performs a variety of processes on the electrical signal output from the image pickup element 122 and outputs the processed image data to each of the image storage unit 140, the image compressor/decompressor 150, the user interface 160 and the face detector 200. The signal processes performed by the signal processor 130 include a noise reduction process, a level correction process, an analog-to-digital (A/D) conversion process, a color correction process, etc. In response to an instruction from the controller 110, the signal processor 130 performs a variety of image processes on an image input from various elements.

The image storage unit 140 stores image data to be processed by the imaging apparatus 100.

The image compressor/decompressor 150 compresses or decompresses a variety of input image data in accordance with each image process. For example, image data compressed by the image compressor/decompressor 150 is output to the recording medium 180 for storage. Image data decompressed by the image compressor/decompressor 150 is output to each of the image storage unit 140, the display 161 and the face detector 200. Compression method may be Joint Photographic Experts Group (JPEG), for example.

The user interface 160 includes the display 161 and a selection receiver 162, and serves as an interface for a user who uses the imaging apparatus 100.

The display 161 displays an image responsive to the image data output by one of the signal processor 130 and the image compressor/decompressor 150. For example, the display 161 displays an image of a subject photographed by the imaging apparatus 100.

The selection receiver 162 converts selection information input by a user into an electrical signal and outputs the resulting electrical signal to the controller 110. if the face detector 200 detects a face from the photographed image displayed on the display 161, the imaging apparatus 100 labels the face with a face position marker to notify the user that the photographed image contains the face. If the image contains the face, the imaging apparatus 100 is set to label the face with the face position marker (ON setting) or not to label the face with the face position marker (OFF setting). The ON and OFF setting may be performed on the selection receiver 162. If a plurality of faces are contained in the image displayed on the display 161, the user is permitted to select the face of a desired person. Such a selection operation may be performed on the selection receiver 162.

Figure 15A:
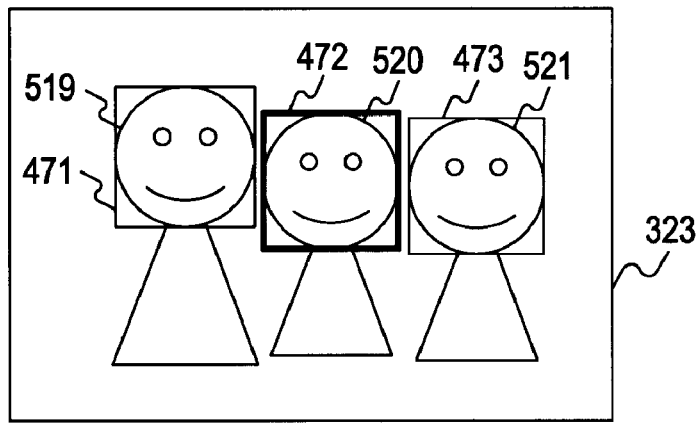
FIGS. 15A-15C illustrate display examples in which human faces labeled with rectangular face position markers are displayed on the display.
Figure 15B:
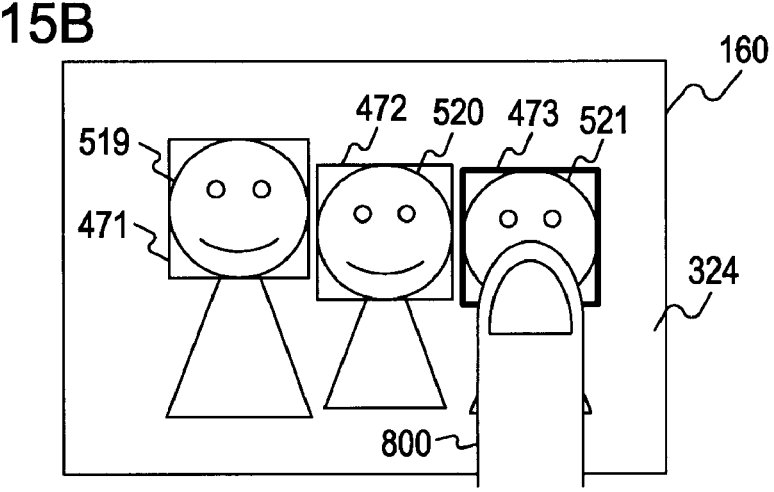
Figure 15C:
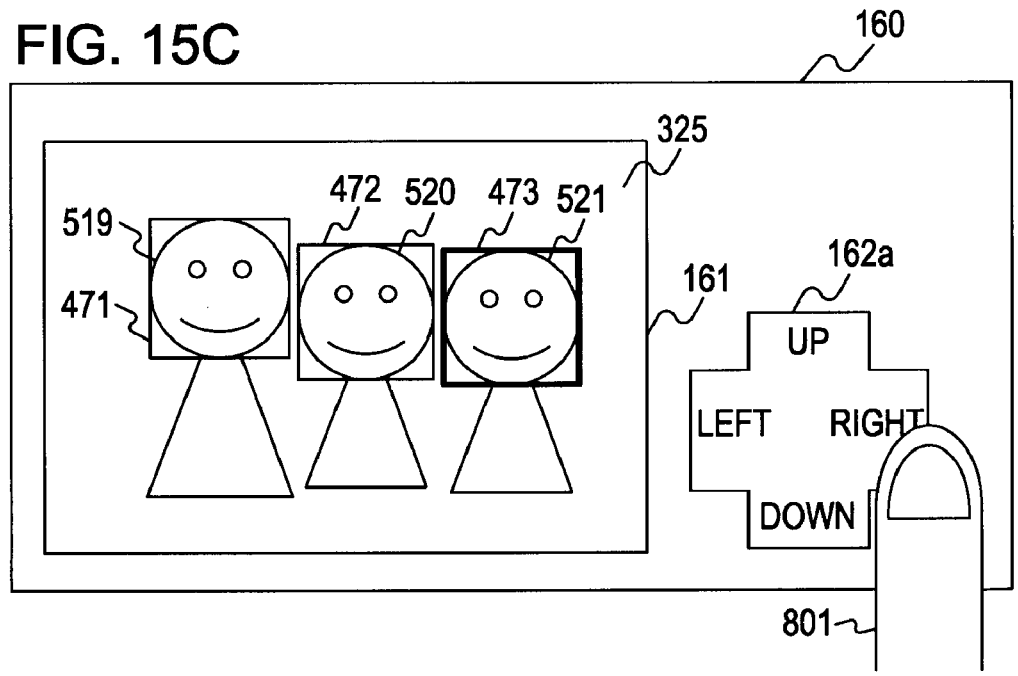

As shown in FIG. 15B, the user interface 160 may be a unitary touchpanel into which the display 161 and the selection receiver 162 are integrated. As shown in FIG. 15C, the display 161 and the selection receiver 162 may be separate units, with the display 161 being a liquid-crystal display (LCD) and the selection receiver 162 being a hard key such as a cross key 162a.

The input-output terminal 170 outputs the image data output from the image compressor/decompressor 150 to an external device such as an external storage device while outputting image data received from the external storage device to the image compressor/decompressor 150.

The recording medium 180 stores the image data output from the image compressor/decompressor 150 while outputting image data therefrom to the image compressor/decompressor 150. The image storage device may be one of a magnetic disk, an optical disk, a semiconductor storage medium and a magnetic tape. The recording medium 180 may be a removable type or an internally fixed type.

The bus 190 is a shared bus for transferring image data.

The face detector 200 detects a face of a person contained in an image responsive to the input data. The face detector 200 will be described in detail with reference to FIG. 2.

The facial expression detector 600 detects a facial expression of each face detected by the face detector 200. The facial expression detector 600 will be described in detail with reference to FIG. 3.

The storage 700 is a volatile or non-volatile recording medium storing a variety of information.

The vibration sensor 710 detects acceleration, movement and tilt of the imaging apparatus 100 and outputs a variety of obtained information to the controller 110. The vibration sensor 710 may include a gyro sensor.

Figure 2:
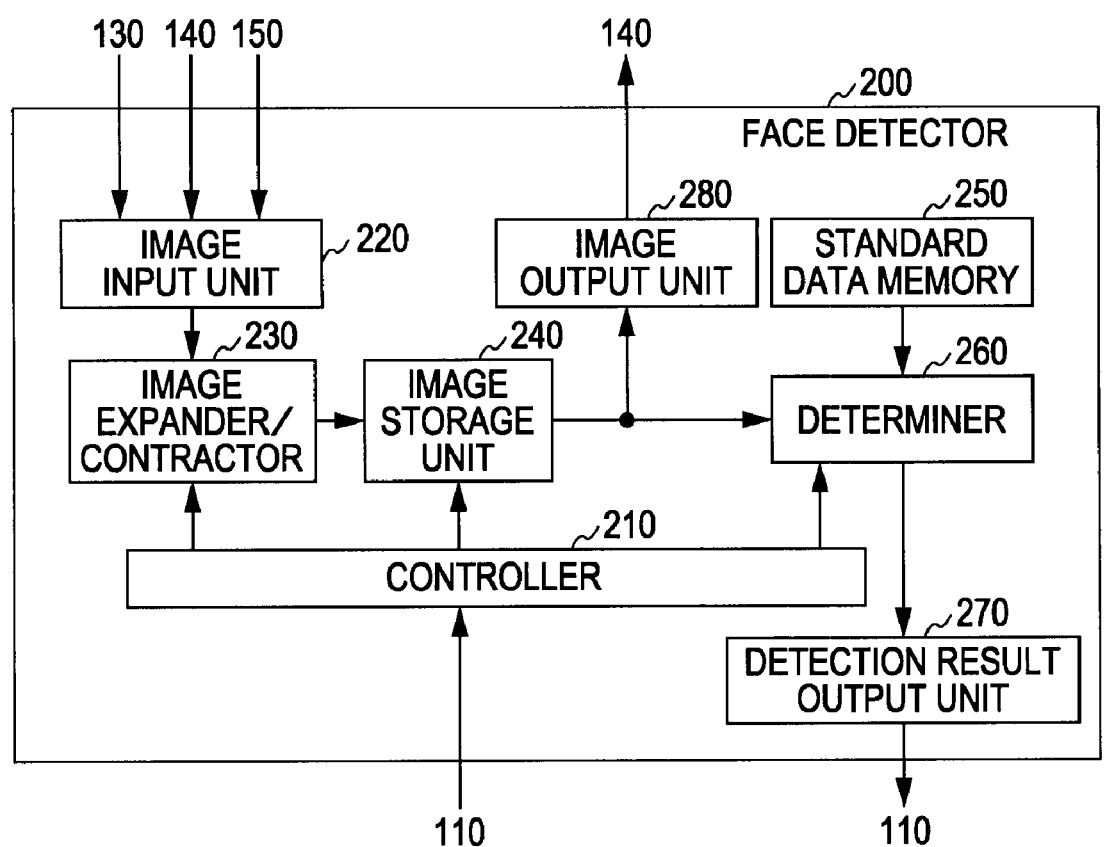
FIG. 2 is a functional block diagram illustrating a face detector.

FIG. 2 is a functional block diagram illustrating the face detector 200.

The face detector 200 includes a controller 210, an image input unit 220, an image expander/contractor 230, an image storage unit 240, a standard data memory 250, a determiner 260, and detection result output unit 270 and an image output unit 280.

The controller 210 under the control of the controller 110 controls each element in the face detector 200.

Upon receiving the image data from one of the signal processor 130, the image storage unit 140 and the image compressor/decompressor 150, the image input unit 220 outputs the input image data to the image expander/contractor 230.

The image expander/contractor 230 expands or contracts an image appropriate for face detection operation in response to the image data output from the image input unit 220. An expansion rate or contraction rate of the image is determined in response to an instruction from the controller 110.

The image storage unit 240 stores an image expanded or contracted by the image expander/contractor 230.

The standard data memory 250 stores standard data of face for use in face detection and outputs the standard data of face to the determiner 260. Face data serving as standard data may include face image, feature database for human face, and feature database relating to the faces of particular persons. Generally, feature data contains more information than the face image and is thus stored on a relatively small capacity memory.

The determiner 260 determines whether a face is contained in an image responsive to the image data stored on the image storage unit 240 and outputs the determination result to the detection result output unit 270. More specifically, the determiner 260 extracts partially by a predetermined window size the image responsive to the image data stored on the image storage unit 240. Based on the correlation between the extracted image and the face data stored on the standard data memory 250, the determiner 260 determines whether the extracted image is a face image. The determiner 260 repeatedly performs this process, thereby determining whether a face is contained in the image responsive to the image data stored on the image storage unit 240.

Based on the correlation with the face data stored on the standard data memory 250, the determiner 260 extracts a variety of data relating to the face contained in the image responsive to the image data stored on the image storage unit 240. The determiner 260 outputs the variety of extracted data as face detection results to the detection result output unit 270.

Upon receiving the determination result and the face detection result output from the determiner 260, the detection result output unit 270 outputs the received determination result and face detection result to the controller 110.

The image output unit 280 outputs the image from the image storage unit 240 to the image storage unit 140.

Values of the face detection result output from the face detector 200 are described below.

Evaluation values (1) through (6) relating to the face area are available as the values of the face detection result output from the face detector 200:

(1) Size of the face (distance from camera)
(2) Position of the face (distance from the center of the image)
(3) Likelihood value of face
(4) Degree of looking away (full face, upward, downward, leftward and rightward looking)
(5) Degree of tilting the head
(6) Upper, lower, left and right positions of the face These values may be used alone to generate the face position marker. These value may be weighted and then used to generate the face position marker. In addition to the evaluation values (1) through (6), the following evaluation values (7) through (9) relating to facial expression and part of the face:

(7) Degree of smiling face
(8) Degree of serious face
(9) Degree of closed eye face These evaluation values may also be used to generate the face position marker.

Figure 3A:
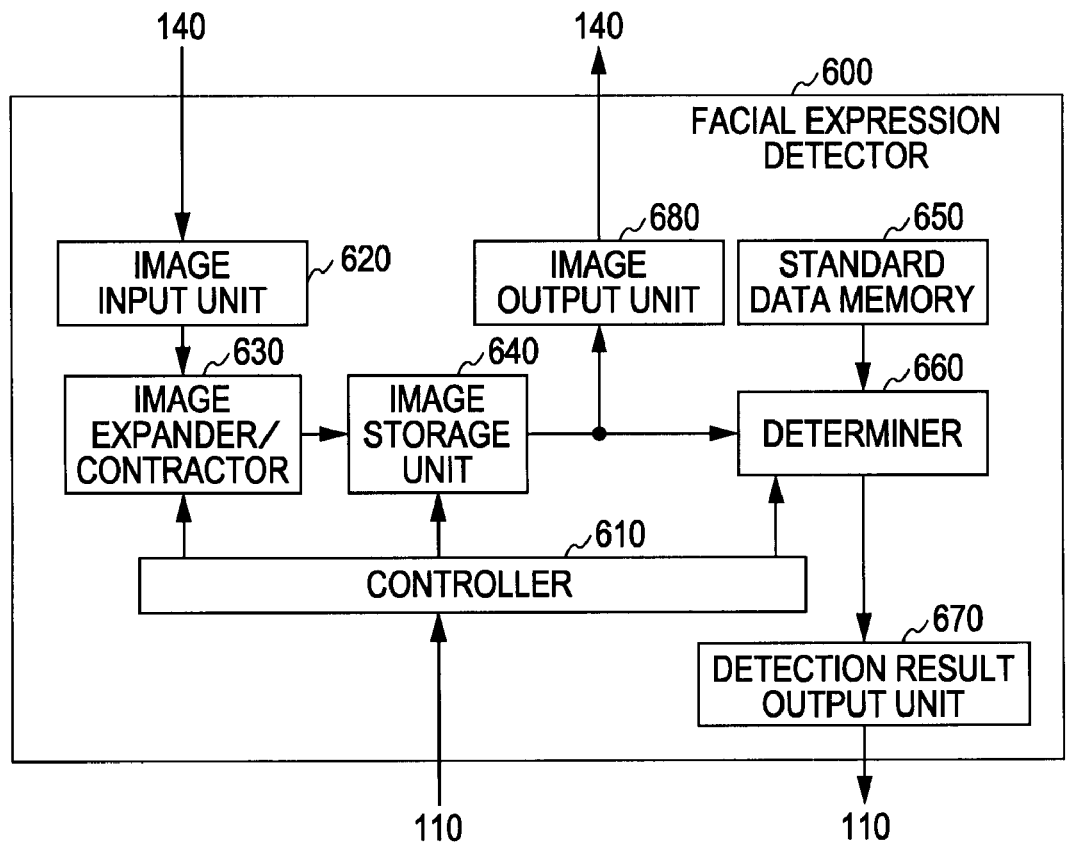
FIGS. 3A and 3B are functional block diagrams illustrating a facial expression detector.

FIG. 3A is a functional block diagram illustrating a facial expression detector 600.

The facial expression detector 600 includes a controller 610, an image input unit 620, an image expander/contractor 630, an image storage unit 640, a standard data memory 650, a determiner 660, a detection result output unit 670 and an image output unit 680.

The controller 610 controls each element in the facial expression detector 600 in response to an instruction from the controller 110.

Upon receiving the image data from the image storage unit 140 responsive to the face detected by the face detector 200, the image input unit 620 outputs the input image data to the image expander/contractor 630.

The image expander/contractor 630 expands or contracts an image, appropriate for use in detection of a variety of information such as facial expression, responsive to the image data output from the image input unit 620. The expansion rate or the contraction rate of the image may be determined in response to an instruction from the controller 110.

The image storage unit 640 stores the image expanded or contracted by the image expander/contractor 630.

Figure 3B:
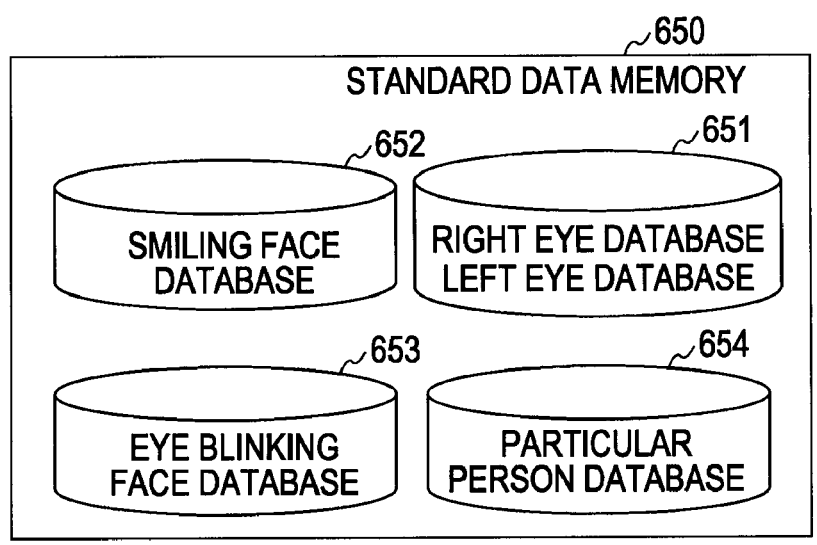

The standard data memory 650 stores the standard data of each portion of the face for use in facial expression detection and outputs the standard data to the determiner 660. The standard data is the image of the eyes, the mouth, etc., the feature database of the human face, and the feature database relating to the face of a particular person. As shown in FIG. 3B, the standard data includes a left eye database and right eye database 651 for extracting the left eye and the right eye of the face image, a smiling face database 652 for use in determining a smiling face, a eye blinking face database 653 for use in determining an eye blinking face, and a particular person database 654 for extracting a person identified by the user as a particular person. Given the same amount of memory capacity, the feature database contains more information than the image itself.

The determiner 660 determines the facial expression of the face image responsive to the image data stored on the image storage unit 640 and then outputs the facial expression to the detection result output unit 670. More specifically, the determiner 660 extracts partially by a predetermined window size the image responsive to the image data stored on the image storage unit 640. Based on the correlation between the extracted image and the face data stored on the standard data memory 650, the determiner 660 extracts a variety of data relating to the extracted image. The determiner 660 repeatedly performs this extraction process, and determines the facial expression of the face image responsive to the image data stored on the image storage unit 640 based on the variety of extracted data.

Based on the value of the face detection result output from the face detector 200, the determiner 660 determines the facial expression of the face image responsive to the image data stored on the image storage unit 640 and outputs the variety of data relating to the determined facial express as the face detection result to the detection result output unit 670.

Upon receiving the face detection result from the determiner 660, the detection result output unit 670 outputs the face detection result to the controller 110.

The image output unit 680 outputs the image from the image storage unit 640 to the image storage unit 140.

A determination method of determining an apparently most important person based on the value of the face detection result output from the face detector 200 is described below.

When there are a plurality of faces in the photographed image, a variety of evaluation values of the faces detected by the face detector 200 are analyzed to determine the apparently most important person. The person is then labeled with a face position marker different in color and line thickness from the face position markers of the other persons. The user is thus notified of that person.

In one of the determination methods of determining the apparently most important person, a total evaluation value E0 is determined using the following equation (1), and any face having a maximum evaluation value E0 is determined to be the most important person. Coefficients E01 through E05 are weight coefficients of the face evaluations values.

$$E0 = E01 \times \text{area of the face region} +$$
$$E02 \times \text{coordinates of the face} +$$
$$E03 \times \text{face likelihood value} +$$
$$E04 \times \text{degree of full face} +$$
$$E05 \times \text{degree of smaller tilt of face} \quad (1)$$

Evaluation value E1 of the focusing and aperture stop of the face is determined based on the value of the face detection result output from the face detector 200.

The evaluation value E1 of the focusing and aperture stop of the face is determined as described below.

In one of the determination methods of determining the evaluation value E1 of the focusing and exposure of the face, the following equation (2) is used:

$$E1 = E10 \times \text{focus evaluation value} + E11 \times \text{exposure evaluation value} \quad (2)$$

An evaluation value E2 of the facial expression is determined based on the value of the face detection result output from the face detector 200 as described below with reference to FIG. 17.

In one of the determination methods of determining the evaluation value E2, the following equation (3) is used:

$$E2 = E20 \times \text{degree of smiling face (or serious face)} + E21 \times \text{degree of avoiding smiling} \quad (3)$$

The facial expression and the degree of eye blinking face are determined based on the face detection result output from the face detector 200.

The facial expression is determined as described below.

To photograph a person preferably in a portrait mode, a shutter button needs to be pressed (or a moving image is recorded) while the person as a subject smiles. During photographing, a photographer conventionally determined whether the person as a subject was sufficiently smiling.

In accordance with one embodiment of the present invention, the imaging apparatus 100 determines whether the subject is in a broad smile by numerically expressing the degree of smiling face.

Template matching techniques with an integrated database containing a variety of face data is widely known to recognize human face as disclosed in Japanese Unexamined Patent Application Publication Nos. 2003-271933 and 2004-30629. As for smiling face, a smiling face database is constructed of a large number of smiling face sample images. By template matching an image as part of the input image with the smiling face database, a determination is made of whether the face is a smiling face or not. In this way, the degree of smiling face is numerically represented.

The following equation (4) is used to calculate the degree of smiling face:

The degree of smiling face $E\text{smile}=Ws0\times$(degree of narrowing eyes)

$+Ws1\times$(degree of widening of the mouth between the left and right corners thereof)

$+Ws2$(degree of exposure of teeth from between the upper and lower lips of the mouth)

$+Ws3$(degree of rising of the left and right corners of the mouth)

$+Ws4$(degree of smiling wrinkles near the left and right corners of the mouth)

$+Ws5$(degree of protroduing cheeks "appearing whitened as a result of protrusion")

$+Wsn$ \hfill (4)

where Wsn represents a weight coefficient for each factor.

During picture taking for certificate use, the subject may have a serious look at the click of the shutter. As smiling face, a serious look database is constructed. By performing a template matching process, the seriousness is numerically represented.

In an equation for calculating the serious look, the degree of opening eyes and the degree of narrowing of the mouth between the left and right corners thereof are defined as reciprocal factors in equation (4).

The degree of eye blinking face is calculated as described below.

When a person is photographed, eye blinking is preferably avoided. A duration of eye blinking (from the start of closing eyes to completely closing the eyes to fully opening the eyes) is not appropriate for photo opportunity. In particular, when a large number of persons are to be photographed, photographing all persons without anyone blinking eyes is difficult. In the conventional art, the photographer manually determines photo opportunity.

In accordance with the present embodiment, the imaging apparatus 100 recognizes whether the subject is blinking eyes or not, and further numerically represents the degree of eye blinking. An eye blinking database is constructed of a large number of eye blinking sample images. By template matching an image as part of the input image with the eye blinking database, the imaging apparatus 100 determines whether the face is an eye blinking face or not. The degree of eye blinking is also numerically represented.

A method of detecting a particular person is described below.

The particular person is a person identified by the user of the imaging apparatus 100. A variety of data relating to the face area of that person is stored as the particular person database 654 on the imaging apparatus 100. The variety of data includes shapes, features and positions of an outline of the face, parts of the face (the eyes, the nose, the eyebrows, the mouth, the ears, the hair, and the whisker) and the glasses. Data of a particular person may be input from the outside to the imaging apparatus 100. A particular person data relating to the face of a particular person is compared with a variety of data in the face area detected from the input image, a correlation value therebetween is calculated to determine whether the persons are the same person. If the person is identified as the same person, that person is determined to be the particular person. Japanese Unexamined Patent Application Publication No. 6-7388 is known for the recognition technique of the particular person in the face image.

Figure 4:
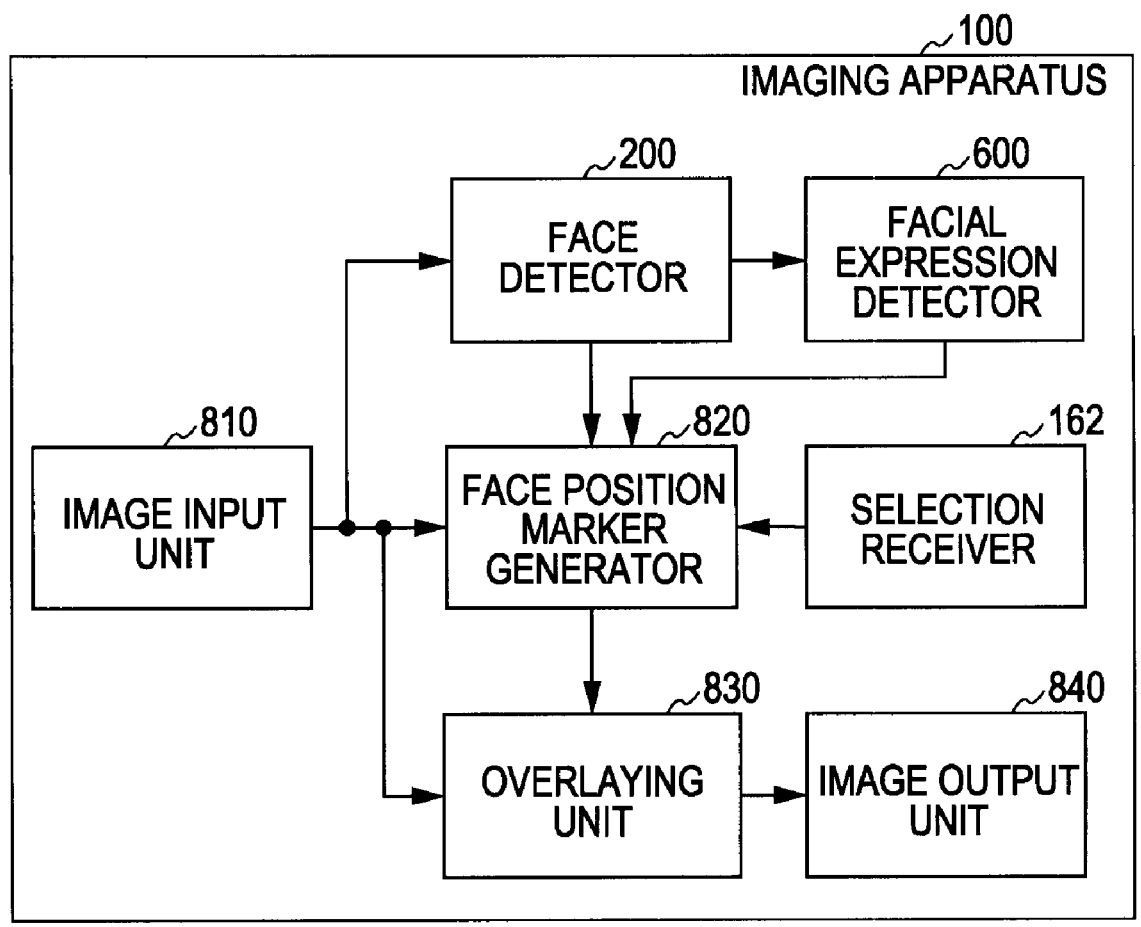
FIG. 4 is a functional block diagram illustrating an imaging apparatus overlaying a face position marker.

FIG. 4 is a block diagram illustrating the face position marker overlaying process of the imaging apparatus 100 in accordance with one embodiment of the present invention.

The imaging apparatus 100 includes an image input unit 810, a face detector 200, a facial expression detector 600, a face position marker generator 820, an overlaying unit 830, an image output unit 840 and a selection receiver 162.

Upon receiving an input image, the image input unit 810 outputs the input image to each of the face detector 200, the face position marker generator 820 and the overlaying unit 830.

The face detector 200, identical to the face detector 200 of FIGS. 1 and 2, detects the face from the image output from the image input unit 810 and outputs the detected face to each of the facial expression detector 600 and the face position marker generator 820.

The face position marker generator 820 generates the face position marker indicating the position of the face detected by the face detector 200 in the image output from the image input unit 810. The face position marker generated is output to the overlaying unit 830. The face position marker is generated for the face detected by the face detector 200, based on the detection result output from the face detector 200 and the facial expression detection result output from the facial expression detector 600. The face position marker generated by the face position marker generator 820 will be described later in detail with reference to FIGS. 5 through 15. If the ON setting relating to the face position marker is output from the selection receiver 162, the face position marker generator 820 generates the face position marker. If the OFF setting relating to the face position marker is output from the selection receiver 162, the face position marker generator 820 does not generate the face position marker.

The overlaying unit 830 overlays the face position marker generated by the face position marker generator 820 on the image output from the image input unit 810 and outputs the overlaid image to the image output unit 840. The overlaying process will be described later with reference to FIG. 5.

The image output unit 840 outputs the overlaid image from the overlaying unit 830. The image output unit 840 corresponds to the display 161 that displays the overlaid image. The image output unit 840 also corresponds to the input-output terminal 170 that outputs image data corresponding to the overlaid image to an external device that displays the overlaid image. The image corresponding to the overlaid image may be output to an image storage medium such as the recording medium 180 for storage.

The selection receiver 162, identical to the selection receiver 162 of FIG. 1, outputs, to the face position marker generator 820, selection information regarding one of the ON setting and the OFF setting relating to the face position marker input by the user.

Figure 5:
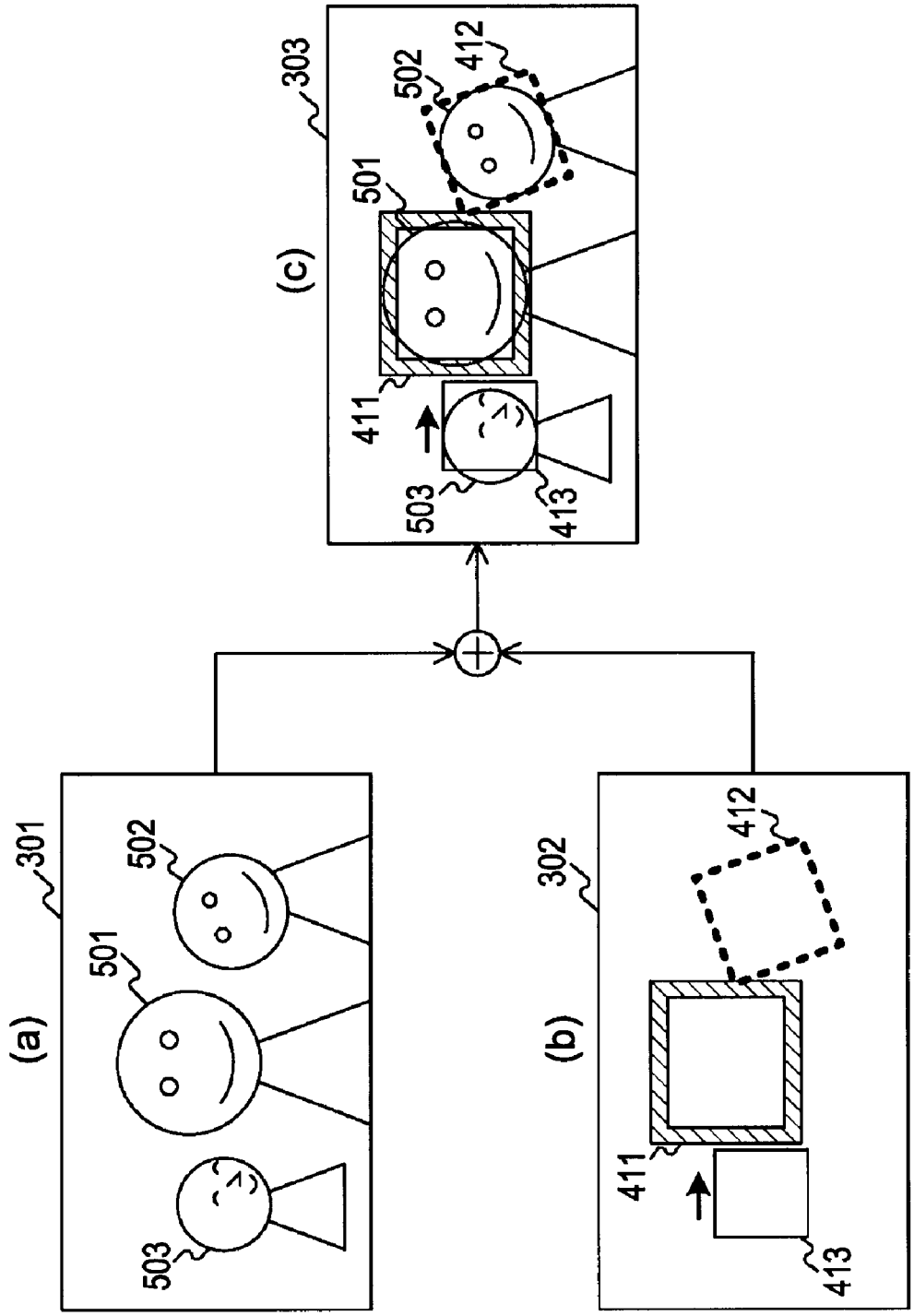
FIG. 5 illustrates an overlaying method of overlaying a face position marker on a photographed image displayed on a display.

FIG. 5 illustrates an overlaying process for overlaying the face position marker on the photographed image displayed on the display 161.

A portion (a) of FIG. 5 illustrates an image 301 as the photographed image displayed on the display 161. The image 301 displayed on the display 161 is successively updated at a predetermined address in the image storage unit 140. The image 301 includes faces 501 through 503 of persons.

A portion (b) of FIG. 5 illustrates face position markers 411 through 413 composed of drawings and symbols, overlaid on the image 301. The face position markers 411 through 413 are written at addresses different from that of the image 301 illustrated in the portion (a) of FIG. 5 in the image storage unit 140. The face position markers 411 through 413 are displayed at positions corresponding to the human faces 501 through 503 contained in the image 301.

A portion (c) of FIG. 5 illustrates an image 303 on which the face position markers 411 through 413 illustrated in the portion (b) of FIG. 5 and the image 301 illustrated in the portion (a) of FIG. 5 are overlaid. The overlaid image 303 includes the photographed image and the face position markers overlaid at a set overlay ratio. By setting an overlay ratio within a range from 0 to 100%, the transparency of the face position marker is modified. The face position marker is thus displayed so that the photographed image is seen through in the overlaid image with a predetermined transparency.

The display examples displayed on the display 161 are described with reference to the drawings.

FIGS. 6A and 6B and FIGS. 7A and 7B illustrate display examples on the display 161 in which the shapes of the face position markers are displayed.

Figure 6A:
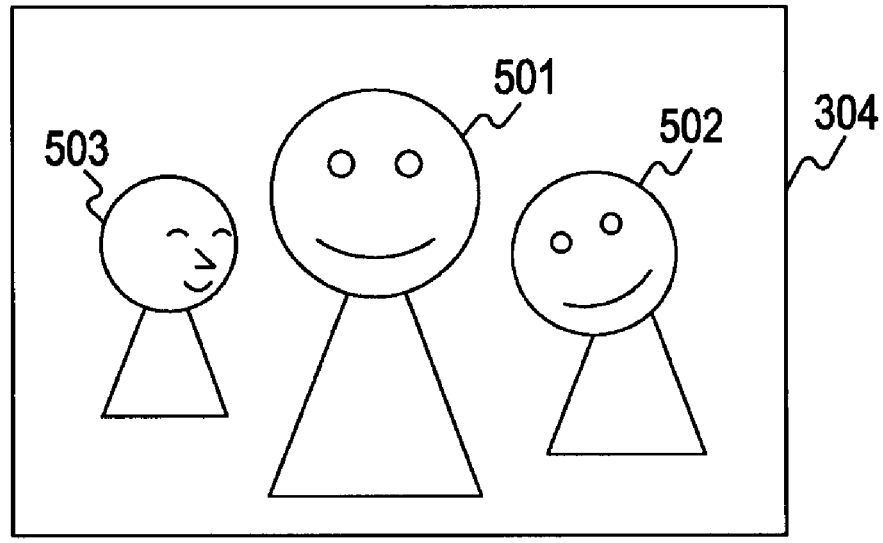
FIGS. 6A and 6B illustrate display examples of an image displayed on the display.

FIG. 6A illustrates a display example (image 304) on the display 161 with the displaying of the face position marker set to OFF. When the selection receiver 162 selects OFF in the displaying of the face position marker, no face position marker is displayed on the display 161.

Figure 6B:
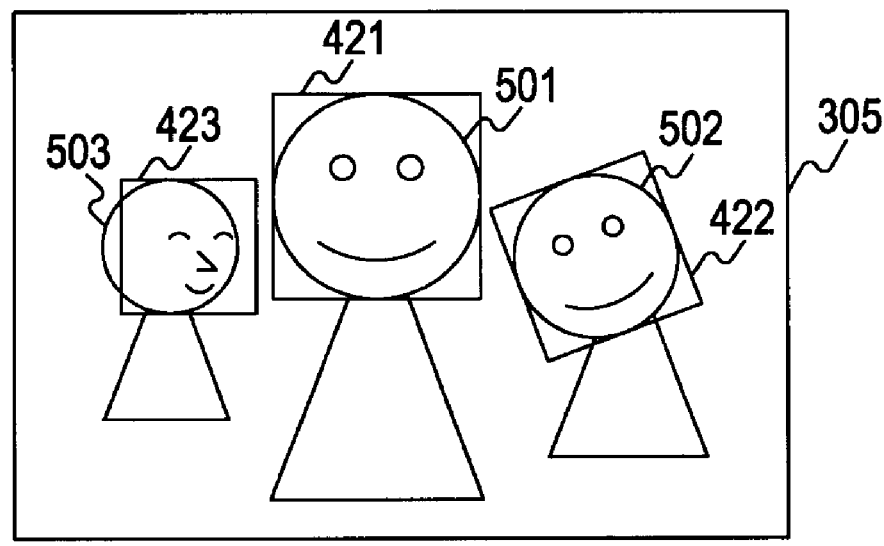
Figure 7A:
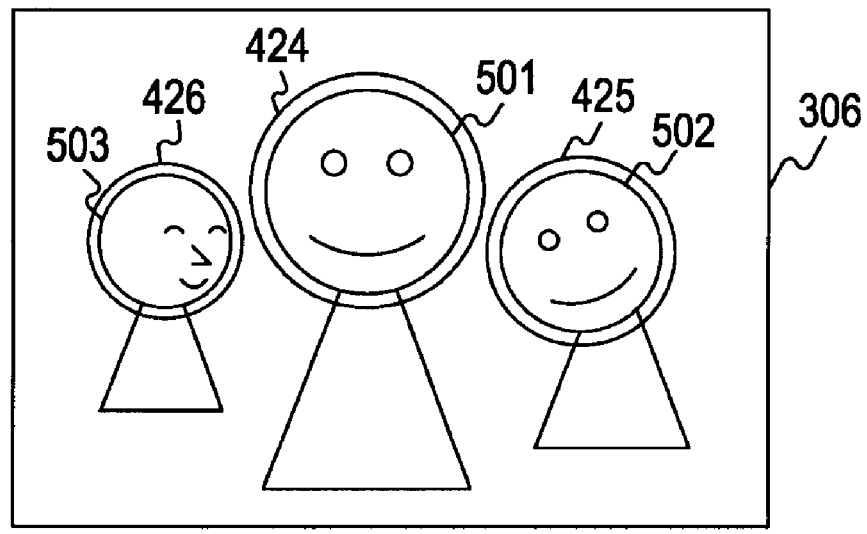
FIGS. 7A and 7B illustrate display examples of an image displayed on the display.
Figure 7B:
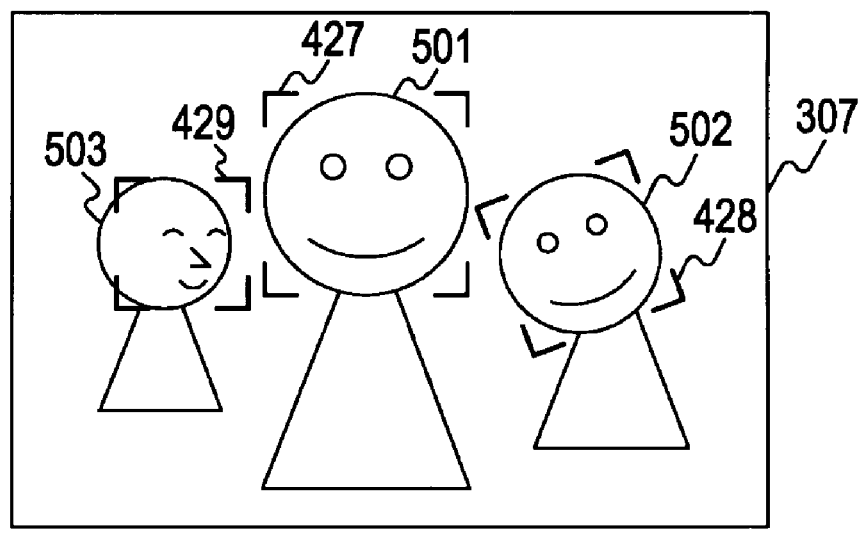

FIGS. 6B, 7A and 7B illustrate the display examples on the display 161 with the display status of the face position marker set to ON. When the selection receiver 162 selects ON in the displaying of the face position marker, the face position marker is displayed on the display 161 if a face is contained in the image on the display 161.

FIG. 6B illustrates a display example (image 305) on the display 161 showing rectangular face position markers 421 through 423 surrounding at least portions of human faces 501 through 503, respectively. The rectangular face position marker may take any shape that permits the maker to be easily displayed, and may be square in shape. If the face position marker is aligned so that the up-down direction and the left-right direction of the face are in parallel with the up-down side and the left-right side of the rectangular face position marker, respectively, as shown in FIG. 6B whether the face displayed on the display 161 is rolled or not is easily determined. More specifically, if a face 502 is rolled (tilted) about the fore-aft axis of the face, a face position marker 522 is also rolled about the center of rotation at the center of the rectangular face position marker along with the tilt of the face. If the head (face), such as a face 503, is rotated about an up-down axis of the face (with the face looking away), a face position marker 423 is also rotated along with the full face direction of the face.

FIG. 7A illustrates a display example (image 306) on the display 161 displaying circular face position markers 424 through 426 surrounding human faces 501 through 503, respectively. For simplicity, the shape of each face is a circle in each of the drawings. The shape of each face is typically drawn as a vertically elongated ellipse. To match the outline of the human face, the face position marker may be elliptically drawn. The use of the elliptical face position marker helps the user visually recognize the human face. For example, if the face position marker has an elliptical shape, the elliptical face position marker is rotated along with the rotation of the face in the same way as shown in FIG. 6B.

FIG. 7B illustrates a display example (image 307) on the display 161 displaying four-corner point face position markers 427 through 428 respectively surrounding the human faces 501 through 503. As shown in FIG. 7B, each four-corner point face position marker is composed of four corner sections with side center portions removed. By displaying the four-corner sections, the display area of the face position marker in the image 307 displayed on the display 161 is relatively reduced. This arrangement makes the photographed image displayed on the display 161 more visible. The four-corner face position marker may also be rotated along with the rotation of the face in the same was as shown in FIG. 6B.

FIGS. 8A-8C and FIGS. 9A-9C illustrate display examples on the display 161 displaying human faces 501 through 503 with a variety of rectangular face position markers respectively attached thereto.

Figure 8A:
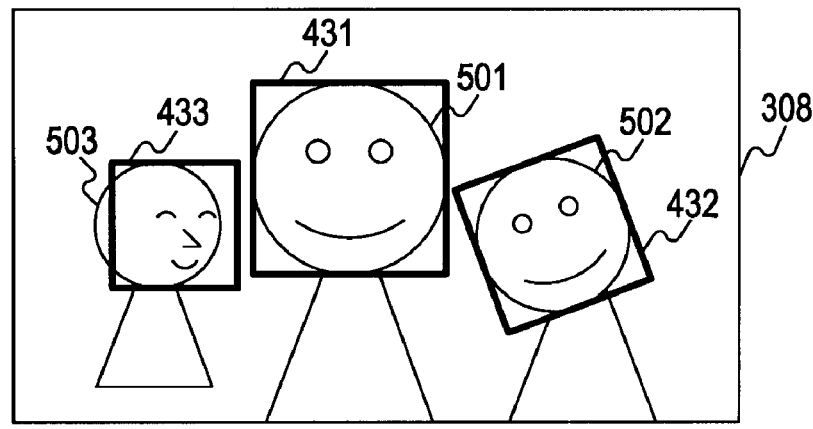
FIGS. 8A-8C illustrate display examples in which human faces labeled with rectangular face position markers are displayed on the display.

FIG. 8A illustrates a display example (image 308) displaying face position markers 431 through 433 different in color. For example, when a plurality of faces are displayed on the display 161, a face position marker of a face of a person determined to be the most important is displayed in yellow, face position markers of the faces of the other persons are displayed in blue, and a face position marker of a face tilted or looking away is displayed in red. By modifying the color of the face position marker depending on the person or the face displayed on the display 161, the user can easily recognize the state of each face. More specifically, if the face of the most important person from among the persons displayed on the display 161 is the face 501, the face 501 is labeled with the face position marker 431. The tilted face 502 is identified by the red face position marker 432. The looking away face 503 is identified by the red face position marker 433. FIG. 8A does now show color presentation.

Figure 8B:
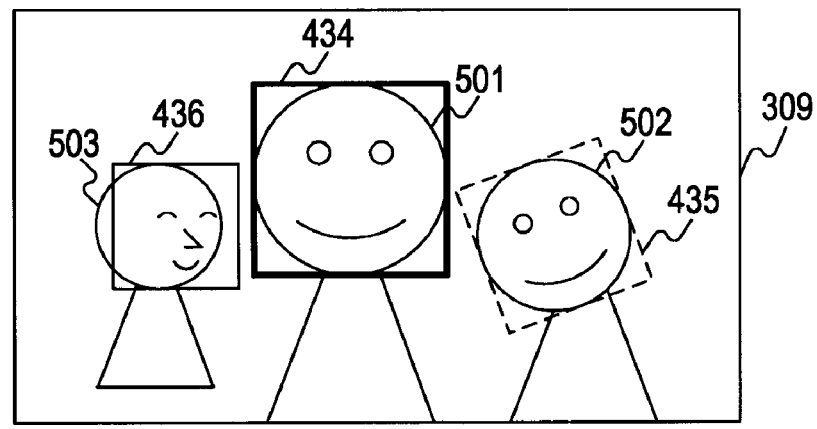

FIG. 8B illustrates a display example (image 309) in which the faces 501 through 503 are identified by the face position markers 434 through 436 represented by solid line or broken line or represented by changing the thickness of the solid line or the broken line. If a face, from among a plurality of faces displayed on the display 161, is not tilted and not looking away, the face position marker accompanying that face is represented in a thick solid line. If a face is tilted, a face position marker accompanying that face is represented in the broken line, and if a face is looking away, a face position marker accompanying that face is represented in the solid line. By modifying the thickness of the line of the face position marker depending on the person or the face displayed on the display 161, the user can easily recognize the state of each face. More specifically, the face 501 having the face neither tilted nor looking away, from among the persons displayed on the display 161, is accompanied by the thick solid line face position marker 434. The face 502 having the tilted face is accompanied by the broken line face position marker 435. The face 503 having the face looking away is accompanied by the face position marker 436. The solid line of the face 501 is made thicker than the solid line of the face 503. More types of lines may be used in addition to the solid line and the broken lines to identify the features and states of the faces.

Figure 8C:
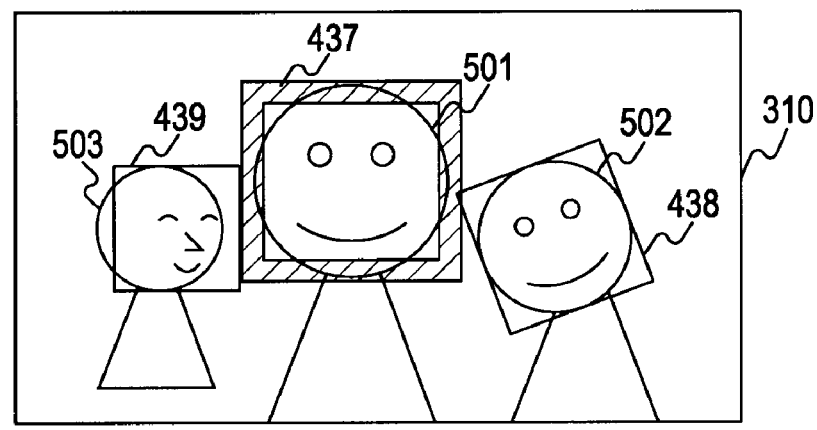

FIG. 8C illustrates a display example (image 310) in which the faces 501 through 503 are discriminated by changing the transparencies of face position markers 437 through 439. If a face has a high face likelihood value from among a plurality of faces displayed on the display 161, a face position marker of that face is displayed in a high density with the transparency decreased. If a face has a low likelihood value from among the plurality of faces, a face position marker of that face is displayed in light low density with the transparency increased. By modifying the transparency of the face position marker depending on the person or the face displayed on the display 161, the user can easily recognize the state of each face. More specifically, if the face of the person having a low face likelihood value from among the persons displayed on the display 161 is the face 501, the face 501 is labeled with the face position marker 437 having a high transparency. The faces 502 and 503 are respectively labeled with the face position markers 438 and 439, each having a low transparency. Since the face position marker 437 labeling the face 501 has a high transparency, the user has difficulty recognizing the face position marker 437. The face position marker 437 may be displayed using a thick line to help the user recognize easily.

Figure 9A:
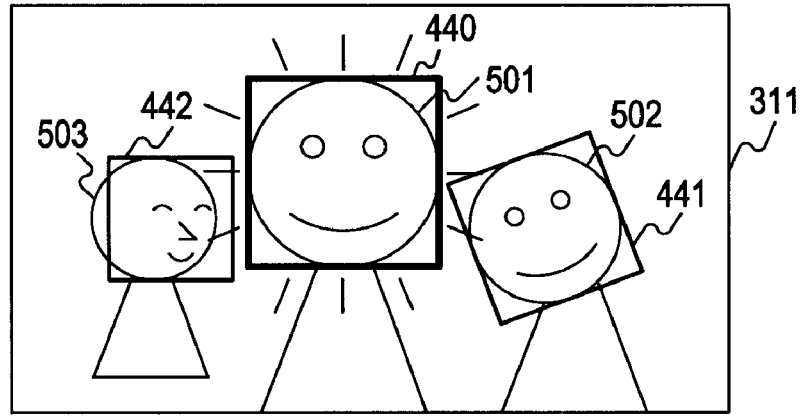
FIGS. 9A-9C illustrate display examples in which human faces labeled with rectangular face position markers are displayed on the display.

FIG. 9A illustrates a display example (image 311) in which at least one of face position markers 440 through 442 is blinked. A face position marker of a face of a person determined to be the most important, from among a plurality of faces displayed on the display 161, is displayed in a blinking state while face position markers of the faces of the persons other than the most important person are displayed in standard state. When focus or aperture changes with the plurality of faces displayed on the display 161, the face position marker of the face of the person having the most appropriate focus value or aperture value is displayed in a blinking state for a predetermined period of time. The face position markers of the faces of the other persons are displayed in the standard mode. By modifying the display state of the face position marker depending on the person or the face displayed on the display 161, the user can easily recognize the state of each face. More specifically, the face of the most important person from among the persons displayed on the display 161 may be the face 501, and the faces of the other persons may be the face 502 and the face 503. A face position marker 440 labeling the face 501 is displayed in a blinking state, and face position markers 441 and 442 respectively labeling the faces 502 and 503 are displayed in the standard display state.

Figure 9B:
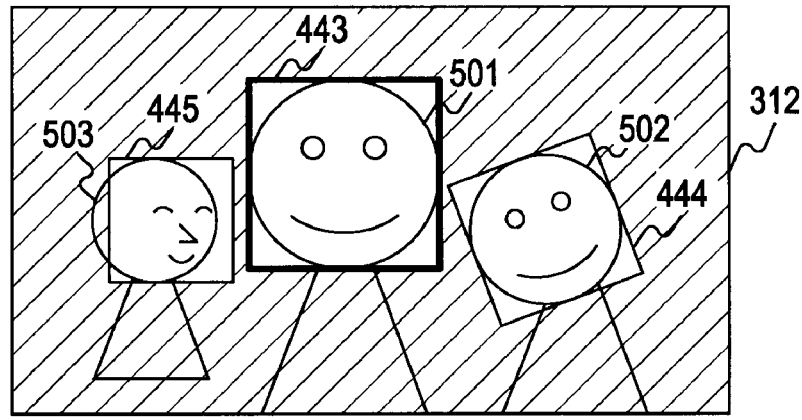
Figure 9C:
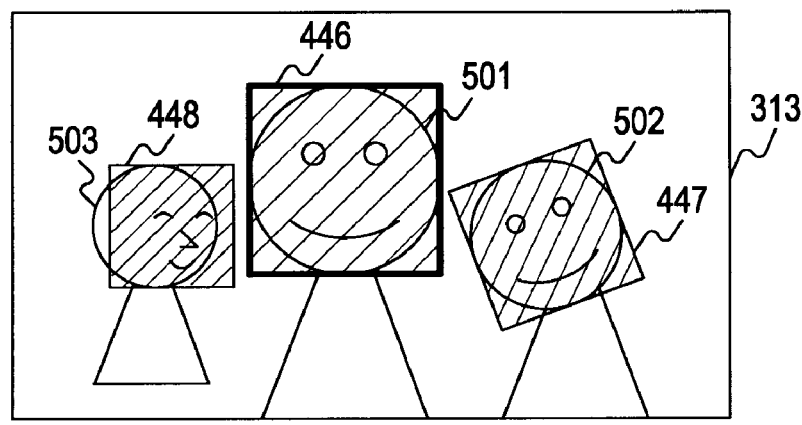

FIGS. 9B and 9C illustrate display examples (image 312 and image 313) in which an internal area (face area) and an external area of each of face position markers 443 through 445 are displayed in different colors. For example, the internal area of the outline of the face position marker of the face displayed on the display 161 is displayed with luminance thereof unchanged, but the external area of the outline of the face position marker is lowered in color saturation, in a single color, or in gray. By changing the display state between the internal area and the external area of the face position marker displayed on the display 161, the can easily recognize the face area. More specifically, as shown in FIG. 9B, the internal areas of the outlines of the face position markers 443 through 445 displayed on the display 161 are unchanged and the external areas of the outlines of the face position markers 443 through 445 are displayed in gray. As shown in FIG. 9C, the internal areas of the outlines of face position markers 446 through 448 displayed on the display 161 are displayed in color easy to recognize, and the external areas of the outlines of the face position markers 446 through 448 are unchanged. Alternatively, the face position marker of the face of the person determined to be the most important may be surrounded by an outline and the face position markers of the faces of the other persons may not be surrounded by outlines.

Figure 10A:
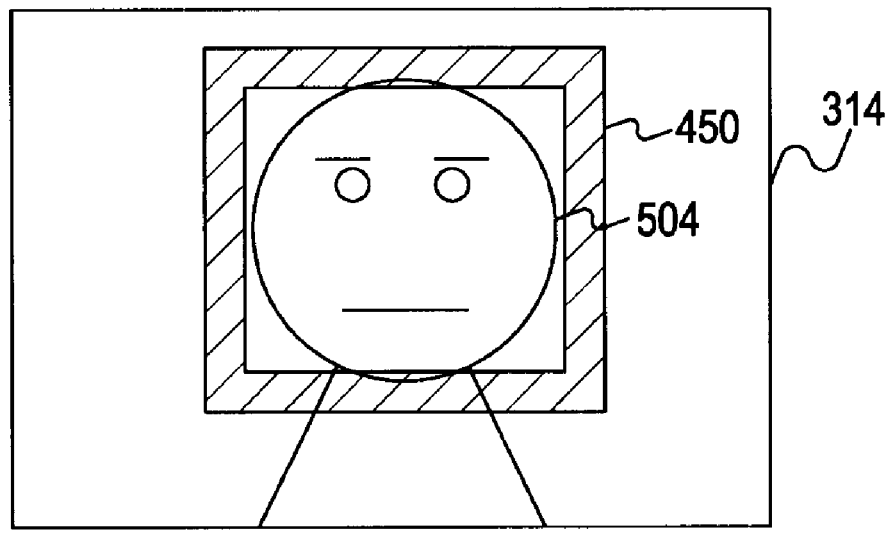
FIGS. 10A and 10B illustrate display examples in which human faces labeled with rectangular face position markers are displayed on the display.
Figure 10B:
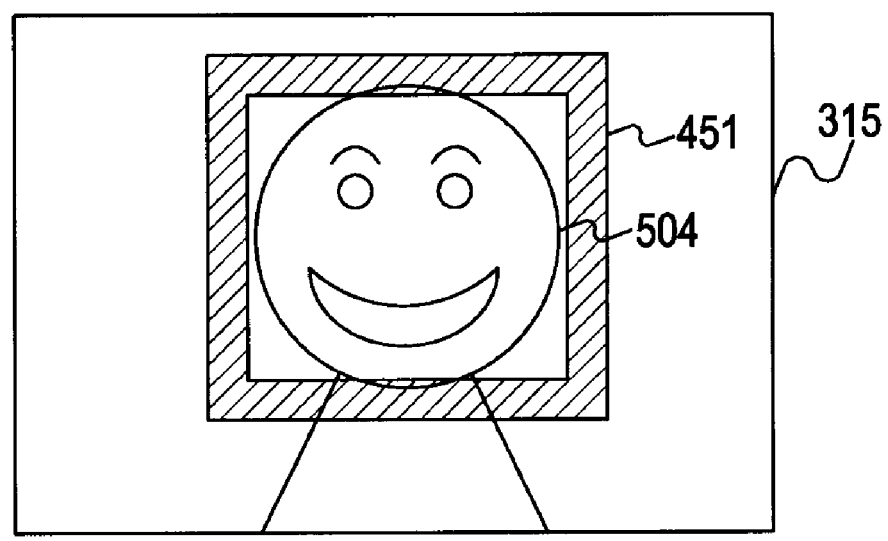

FIGS. 10A and 10B illustrate display examples on the display 161 displaying a human face 504 labeled with varied rectangular face position markers.

The face position marker is displayed in a different display mode in accordance with the evaluation value relating to each face area of the value of the face detection result output from the face detector 200. The user is thus easily notified of a change in the face and photographing conditions. For example, display examples (images 314 and 315) with the transparency of the face position marker changed in response to the degree of smiling face are described with reference to FIGS. 10A and 10B.

When the degree of smiling face is high on the face displayed on the display 161, the transparency of the face position marker labeling the face is lowered, thereby resulting in a dense face position marker. On the other hand, when the degree of smiling face is low, the transparency of the face position marker labeling the face is increased, thereby resulting in a light face position marker. The transparency is changed depending on a change in the degree of smiling face. In this case, the transparency of the face position marker is changed in steps of transparency, with each step preferably set to be too small enough for the user to recognize. By changing the transparency of the face position marker in response to the degree of smiling face of the person displayed on the display 161, the user can easily recognize the smiling face. More specifically, when a face 504 displayed on the display 161 has a low degree of smiling face as shown in FIG. 10A, the face 504 is labeled with a face position marker 450 having a high transparency. When the face 504 has a high degree of smiling face as shown in FIG. 10B, the face 504 is labeled with a face position marker 451 having a low transparency.

The transparency of the face position marker is modified in accordance with the degree of smiling face. In the same way, the face position marker is displayed in a blinking state if a person as a subject is broadly smiling or if a plurality of persons opens their eyes without eye blinking. The apparatus thus notifies the user of photo opportunity.

Figure 11A:
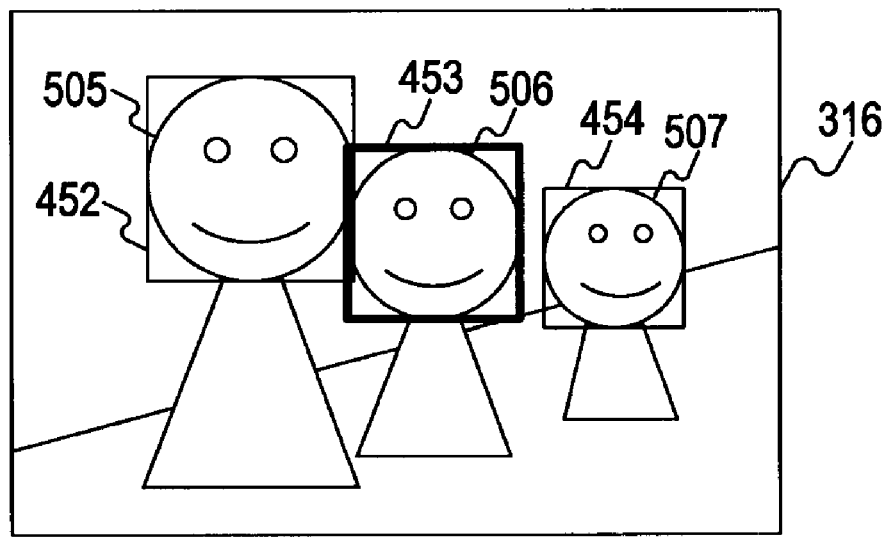
FIGS. 11A and 11B illustrate display examples in which human faces labeled with rectangular face position markers are displayed on the display.
Figure 11B:
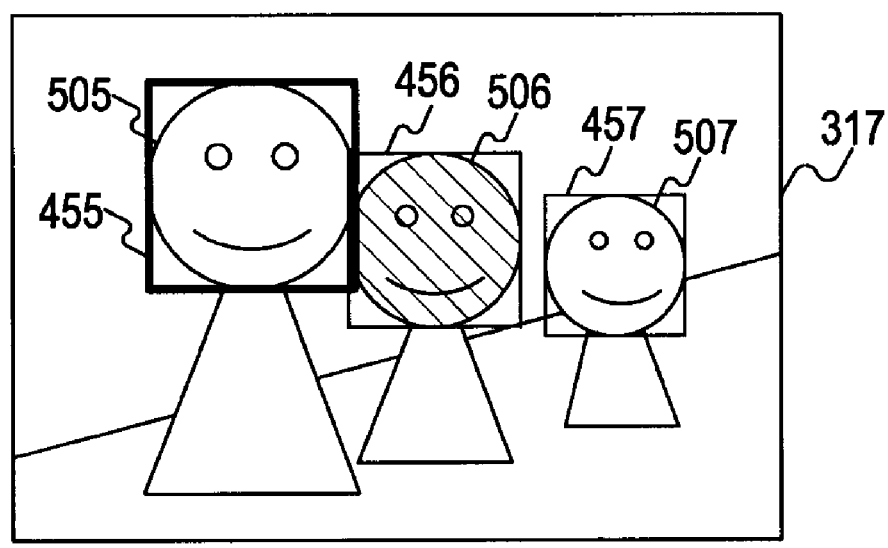

FIGS. 11A and 11B illustrate display examples (images 316 and 317) on the display 161 displaying human faces 505 through 507 with rectangular face position markers associated therewith. The face position markers change in response to the state of focusing and aperture.

The user is notified of photographing conditions or the like by displaying the face position markers in different modes based on the evaluation value of each face area out of the face detection result output from the face detector 200. With reference to FIGS. 11A and 11B, the display examples are described below. In the display examples, the face position markers are changed in response to in-focus state and lens exposure setting.

In one of in-focus detection methods, an auto focus (AF) detection window is set up in the face area, and a high frequency component of image is determined within the AF detection window. The higher the integral value of the high frequency component, the more likely the in-focus state is considered to be reached. The in-focus state is thus obtained in a high-accuracy evaluation value. In one of appropriate lens exposure state detection methods, an appropriate lens exposure value and a luminance value of the face image responsive to the appropriate lens exposure value are preset. The closer, the detected values are to the preset values, the more appropriate the lens exposure setting is.

Several methods of notifying the user of a focused portion of the image are contemplated. For example, the focused portion may be displayed in a different color. Also, the color of the focused portion is switched in steps in response to the in-focus state. A frequency distribution graph of the entire image or of the AF window may be displayed, and the user may monitor how the high frequency component increases while focusing on the subject. Furthermore, AF multi-windows may be displayed with a in-focus window displayed in a different color or in a blinking state.

However, the above display is intended to let the user know the in-focus portion. In contrast, in accordance with the embodiments of the present invention, the face detector 200 detects a human face from the image, determines the degree of in-focus state with respect to the face area, and displays the face position marker responsive to the degree of in-focus state. Rather than handling the entire image as an AF detection target, the apparatus sets up an AF detection window only on the face area obtained through image recognition, and display the in-focus state in the face position marker to the user. The user can thus know the area identified as the face while also knowing how in-focus state is achieved on what portion of the face area. If the user thinks of one of a plurality of persons as an important person, the user can easily recognize an appropriate AF function works on the face area of that person.

A plurality of faces, different in distance to the imaging apparatus 100, may be displayed on the display 161. The face position markers of an in-focus face and the other faces may be displayed differently by changing color and line thickness thereof. Furthermore, the face position marker may be displayed with the transparency thereof changed in response to the degree of in-focus state. A plurality of persons displayed on the display 161 may be differently exposed to sun light. In such a case, a face having the lens exposure state matched thereto and other faces are labeled with the face position markers thereof different in color and line thickness. The face position markers may be displayed with the transparency thereof changed in response to the lens exposure state. The user can thus easily know the photographing conditions of whether each face is in-focus or not, by modifying the displaying of the face position marker in response to the degree of in-focus state of the face of the person displayed on the display 161.

As shown in FIG. 11A, from among the persons displayed on the display 161, a person of the highest degree of in-focus state has a face 506, a person closer to the imaging apparatus 100 than the person having the face 506 has a face 505, and a person farther from the imaging apparatus 100 than the face 506 has a face 507. A face position marker 453 of the face 506 is displayed in thick and yellow line, and face position markers 452 and 454 of the faces 505 and 507 are displayed thin and red line.

As shown in FIG. 11B, the display 161 displays a plurality of persons different in exposure level to sun light. A face 505 has the highest degree of lens exposure appropriateness (having an appropriate lens exposure value) is a face 505, a face 506 has a low degree of lens exposure appropriateness and dark color and a face 507 has a low degree of lens exposure appropriateness and light color. A face position marker of the face 505 is displayed in thick and yellow line, and face position markers 456 and 457 of the faces 506 and 507 are displayed in thin and red line.

Figure 12:
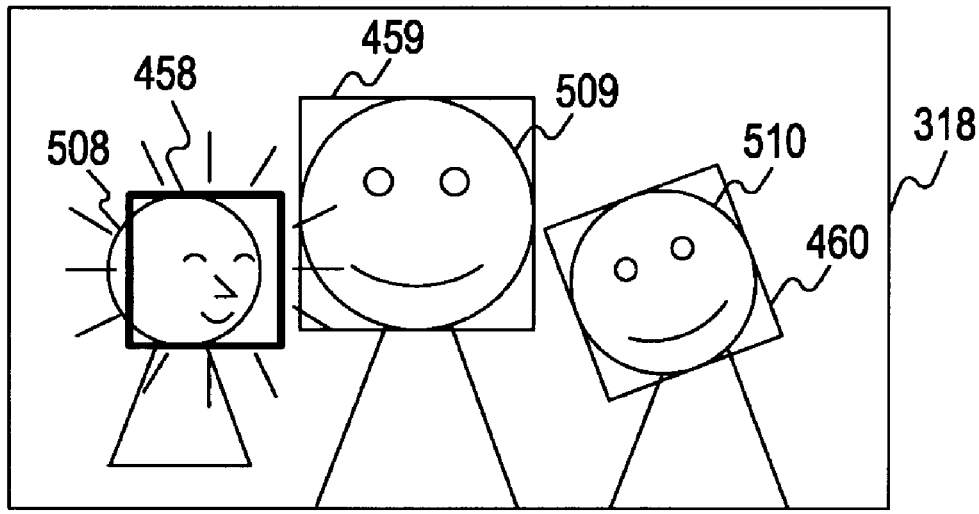
FIG. 12 illustrates display examples in which human faces labeled with rectangular face position markers are displayed on the display.

FIG. 12 illustrates a display example (image 318) on the display 161 displaying human faces 508 through 510 with rectangular face position markers attached thereto. The face position markers are displayed in varied form depending on the presence or absence of a particular person.

The user can easily know a particular person by displaying the face position markers differently depending on the evaluation value relating to each face area out of the values of the face detection result output from the face detector 200.

A plurality of persons are displayed on the display 161. If the face of a particular person is present among the plurality of faces, a face position marker is displayed to discriminate clearly the face of the particular person from the other faces. For example, the face position marker of the particular person is displayed in a blinking state. The user can thus easily recognize the face of the particular person by changing the display mode of the face position marker if the particular person is present among the plurality of persons displayed on the display 161.

As shown in FIG. 12, the face of the particular person displayed on the display 161 is a face 508, and faces of unknown persons are faces 509 and 510. A face position marker 458 attached to the face 508 is displayed in thick line in a blinking state while face position markers 459 and 460 respectively attached to the faces 509 and 510 are displayed in thin line.

Figure 13:
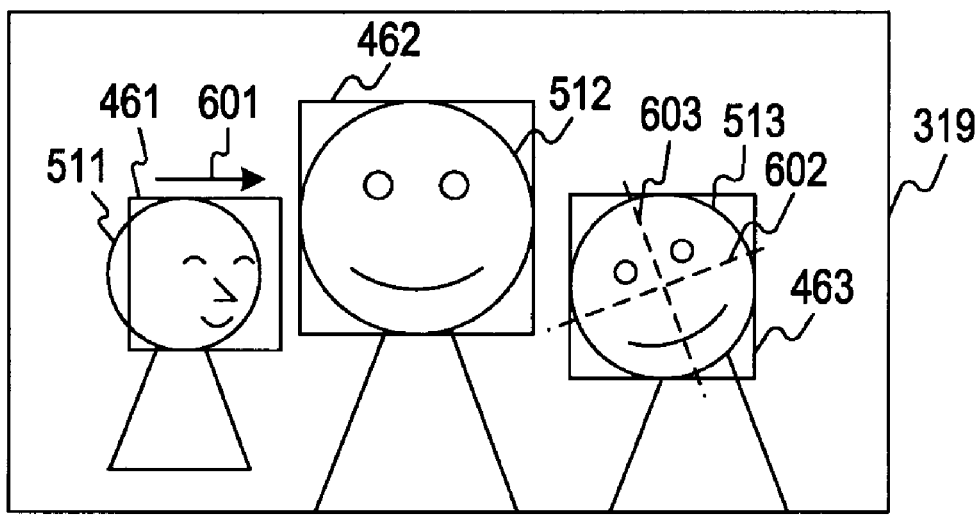
FIG. 13 illustrates display examples in which human faces labeled with rectangular face position markers are displayed on the display.

FIG. 13 illustrates a display example (image 319) on the display 161 displaying human faces 511 through 513 with rectangular face position markers attached thereto. The face position markers are displayed in varied mode depending on the looking direction and tilt of the face.

The user can easily known the looking direction and tilt of the face by displaying one of the face looking direction marker and the face tilt maker together with the face position marker in response to the evaluation value of each face area out of the values of the face detection result output from the face detector 200.

Any face of a plurality of faces displayed on the display 161 may look in an upward direction, a downward direction, a leftward direction or a rightward direction. That face is labeled with a face position marker. The face position marker is accompanied by a face looking direction marker, internally or externally to the face position marker, such as an arrow-headed line indicating the face looking direction. Depending on how much the face looks away from the full face alignment, the length, the color and density of the arrow-headed line may be changed to notify the user of the face looking direction. If any face from among the plurality of faces displayed on the display 161 is in a full face alignment, the face position marker displayed is accompanied by the face looking direction marker. The user can thus easily recognize the face looking away.

Any face of a plurality of faces displayed on the display 161 may be tilted. That face is labeled with a face position marker. The face position marker is accompanied by a face tilt marker internally or externally thereto. The face tilt marker represents the center line of the face or the horizontal line of the face. More specifically, as shown in FIG. 13, a rotated face 511 of a person from among a plurality of persons displayed on the display 161 is accompanied by a face looking direction marker 601 and a face position marker 461. A tilted face 513 is accompanied by a face position marker 463 and a face tilt marker composed of the center line 602 of the face and the horizontal line 603 of the face. A face 512 in a full face alignment is typically accompanied by a face position marker 462.

Figure 14A:
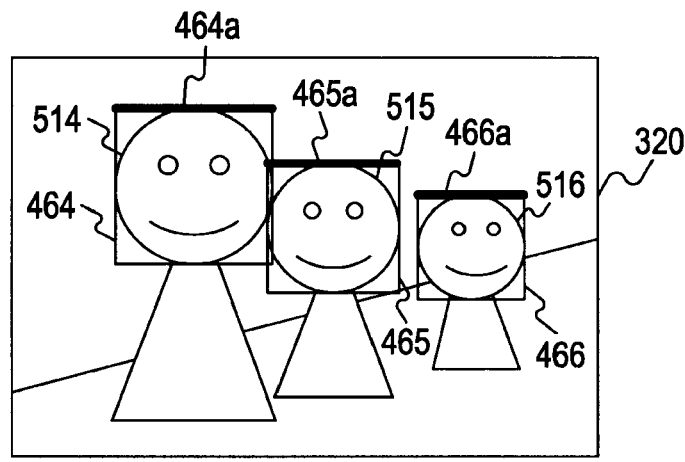
FIGS. 14A-14C illustrate display examples in which human faces labeled with rectangular face position markers are displayed on the display.
Figure 14B:
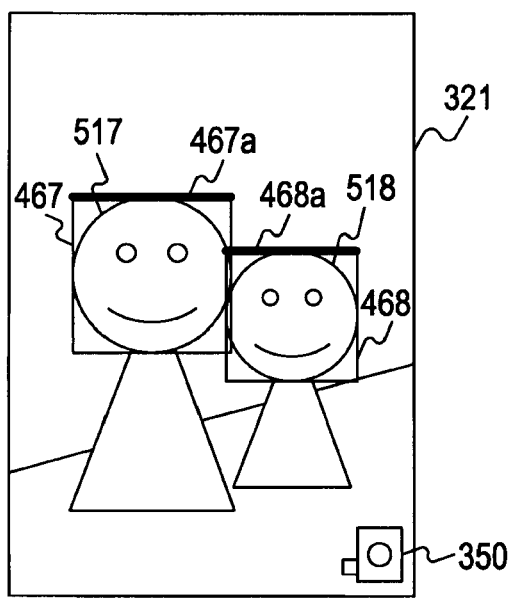
Figure 14C:
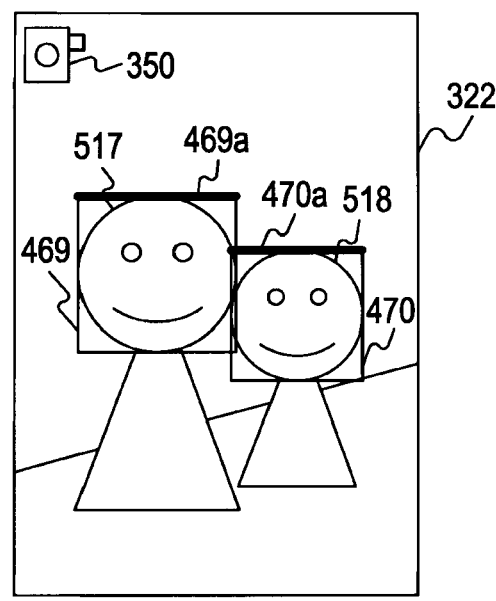

FIGS. 14A-14C illustrate display examples (images 320-322) on the display 161 displaying human faces 514-518 with rectangular face position markers respectively attached thereto. The face position markers are displayed in varied mode in response to upper, lower, left and right positions on the face.

The user can easily recognize the face looking direction and the tilt of the face by displaying the face position marker with one of a top side, a bottom side, a left side and a right side thereof based on the evaluation value relating to each face area out of the face detection result output from the face detector 200.

For example, a face displayed on the display 161 is accompanied by a face position marker. The top side of the face position marker is displayed to indicate the upper side of the face. For example, the top side of the face position marker indicating the upper side of the face is displayed in thick and red line while the other sides of the face position marker are displayed in normal thickness and yellow line. If a human face is present in the image displayed on the display 161, that face is accompanied by the face position marker with the top side thereof displayed in particular display mode. The user thus easily recognizes the upper side of the face.

As shown in FIG. 14A, human faces 514-5146 are respectively accompanied by face position markers 464-466 on the display 161. Top sides 464a-466a of the face position markers 464-466 are displayed in thicker and red line while the other sides are displayed in normal thickness and yellow line (color presentation of the face position marker is not shown in FIGS. 14A-14C).

As shown in FIGS. 14B and 14C, human faces 517 and 518 are accompanied by face position markers 467-470 on the display 161. The top sides 467a-470a of the face position markers 467-470 are displayed in thick and red line and the other sides are displayed in normal thickness and yellow line (color presentation is not shown). In still picture taking, photographing is typically performed in a portrait format as shown in FIGS. 14B and 14C. By displaying the top side of the face position marker in a particular display mode, the upper, lower and left and right sides of the face are easily recognized. The imaging apparatus 100 thus automatically recognizes that photographing is performed in a portrait mode.

FIG. 14B illustrates an image 321 that is photographed with one of the sides of the imaging apparatus 100 kept down. FIG. 14C illustrates an image 322 that is photographed with the other side of the imaging apparatus 100 down. In the photographed images 321 and 322, a camera symbol 350 indicating the upper side of the imaging apparatus 100 helps the user to easily recognize the alignment of the portrait view angle of the imaging apparatus 100. Information relating the portrait view angle may be stored as incidental information of the photographed image together with the photographed image on a recording medium. If the top side of the photographed image is not aligned with the top side of each portrait image stored on the storage medium, an indication to that effect may be displayed on the display 161. In this way, the portrait photographed image stored on the storage medium is thus aligned. When each image stored on the storage medium is displayed on the display 161, the portrait images are thus aligned, and the user can view the images easily.

One side of the face (for example, the upper side of the face) corresponding to one of the top, bottom, left and right sides of the rectangular face position marker is displayed, the other sides are easily recognized. To simply the display and to assure ease of view, the upper side of the face is displayed in a different color or a broken line. The upper side, the lower side, the left side and the right side of the face may be displayed in different colors for easy discrimination. The upper side, the lower side, the left side and the right side of the face may be determined based on the variety of information detected by the vibration sensor 710.

When one of the upper side, the lower side, the left side and the right side of the face are displayed, the corresponding side of the face position marker is displayed in a different display mode. Alternatively, a particular position marker indicating one of the upward, downward, leftward and rightward direction of the face may be generated separately from the face position marker. The particular position marker may be displayed in the vicinity of the face position marker.

FIGS. 15A-15C illustrate display examples (images 323-325) on the display 161 displaying human faces 519-521 with rectangular face position markers respectively attached thereto. The face position markers are displayed in varied mode to show the face of a major person.

The face position marker of the face of the major person in a display mode different from that of the faces of the other persons based on the evaluation value relating to the face area out of the values of the face detection result output from the face detector 200. The user can thus easily recognize the face of the major person.

For example, a plurality of faces are displayed on the display 161. If a face of a person determined to be a major person is present among the plurality of faces, the face position marker of that face is displayed in thick and red line while the face position markers of the faces of the other persons are displayed in normal thickness and yellow line. If the person determined to be the major person is different from the person intended by the user, the selection receiver 162 in the user interface 160 may select the face of the person intended by the user. The face selected by the user is continuously tracked as the major person until the face area thereof is no long detected. The face position marker attached to the face is also displayed in a different display mode. If the face of the major person is present in the image displayed on the display 161, the face position marker of the face is displayed in a manner different from the other face position markers. The user can thus easily recognize the face of the major person. Tracking the plurality of persons contained in the image imposes high workload on the CPU. The workload on the CPU is substantially reduced by tracking continuously only the face of the major person.

As shown in FIG. 15A, a face 520 of a person determined to be the major person by the imaging apparatus 100 from among faces 519-521 is displayed on the display 161. The faces 519-521 are respectively accompanied by face position markers 471-473. The face position marker 472 of the face 520 of the person determined to be the major person is displayed in thick and red line and the other face position markers 471-473 are displayed in normal thickness and yellow line (color presentation is not shown herein).

The face 520 of the person determined to be the major person by the imaging apparatus 100 from among the faces 519-521 is displayed on the display 161. The user interface 160 includes a touchpanel. If the person determined to be the major person by the imaging apparatus 100 is different from the person intended by the user, the face of the person intended by the user is selected from among the faces 519-521 of the persons displayed on the display 161 by pressing a finger 800 on the user interface 160 as shown in FIG. 15B. The face of the person selected by the user is a face 521. The faces 519-521 are respectively accompanied by face position markers 471-473. The face position marker 473 of the face 521 of the person selected by the user is displayed in thick and red line. The other face position markers 471 and 472 are displayed in normal thickness and yellow line (color presentation is not shown).

The face 520 of the person determined to be the major person by the imaging apparatus 100 is among the faces 519-521 of the persons displayed on the display 161. the selection receiver 162 in the user interface 160 is a cross key 162a for up, down, left and right directions. If the person determined to be the major person is not the person intended by the user, the person intended by the user is selected from among the faces 519-521 of the persons displayed on the display 161 by pressing a finger 801 on the cross key 162a as shown in FIG. 15C. The face of the person selected by the user is the face 521. The faces 519-521 are respectively accompanied by the face position markers 471-473. The face position marker 473 of the face 521 of the selected person is displayed in thick and red line while the other face position markers 471 and 472 are displayed in normal thickness and yellow line (color presentation is not shown).

Interactive operation on the user interface 160 applied to auto focus (AF) process is described below.

The user may select a major person in the interactive operation on the user interface 160. For example, in an operation of the control software of the imaging apparatus 100, an AF detection window is set up on the face, the body and limbs of the selected major person using horizontal and vertical coordinates of the face area and face area size detected by the face detector 200. Even if a plurality of persons different in distance from the imaging apparatus 100 are present, the AF window is set up on only the major person, and a focusing lens is driven to focus on only the major person. In this way, without being affected by the other persons and the background, appropriate auto focusing is achieved on the major person.

The interactive operation of the user interface 160 applied to an auto exposure (AE) process is described below.

The interactive operation of the user interface 160 may be applied to auto exposure (AE) control. For example, when faces of a plurality of persons are present in the same image, each face has its own best exposure value depending on illumination, exposure to light, the color and luminance of the face. The user may then select one face area, sets an AE detection window on the face area, and adjusts the exposure value so that the face has the most appropriate luminance. With this arrangement, the AE is prevented from being affected by another person or prevented from being adjusted on a different person. Furthermore, the image apparatus is free from underexposure in which the face of the major person is darkened or overexposure in which the face of the major person is whitened as a result of the AE drawn to the background (the sky, walls, transparent materials, trees, etc).

The interactive operation of the user interface 160 applied to auto white balance (AWB) is described below.

The interactive operation of the user interface 160 may be applied to the AWB. For example, when faces of a plurality of persons are present in the same image, the optimum AWB is different depending on the type of a light source (sun light, incandescent lamp, fluorescent lamp, etc.), and color temperature and light intensity of the light source. The user may then select one face area, sets an AWB detection window on the face area, and adjusts a gain value to each color of white balance so that the face has an appropriate skin color. With this arrangement, the AWB is prevented from being affected by another person or prevented from being adjusted on a different person. Furthermore, the image apparatus is free from an inappropriate color balance such as bluish skin color or reddish skin color of the face area of the major person as a result of the AWB drawn to the background (the sky, walls, transparent materials, trees, etc).

If ranges of hue and color saturation preferable as the skin color of the face are known, the white balance may be set so that the skin color of the major person may be drawn to a preferable color space. In this case, the person selected as the major person may be photographed in even more beautiful color, and a high quality image of the person results.

The interactive operation of the user interface 160 applied to tracking function of AF, AE and AWB is described below.

During a monitoring mode and a moving picture taking mode of a digital still camera, a person moves around within the image. If the user selects a major person, the AF control to that person is continuously performed. Once the imaging apparatus 100 has focused on the major person, that person is continuously tracked with the AF maintained until that person disappears from within the image.

Like the AF, the major person is continuously tracked the AE and the AWB maintained during the monitoring mode or the moving picture taking mode.

From among the AF, the AE and the AWB, the AF requires the highest tracking performance. The imaging apparatus 100 thus selects one face from among a plurality of persons and performs a high-speed tracking AF in a manner free from erratic focusing and stray focusing.

FIGS. 9A-9C through FIGS. 15A-15C illustrates rectangular face position markers. The present invention is applicable to face position markers having other shapes.

The operation of the imaging apparatus 100 of one embodiment of the present invention is described below with reference to the drawings.

Figure 16B:
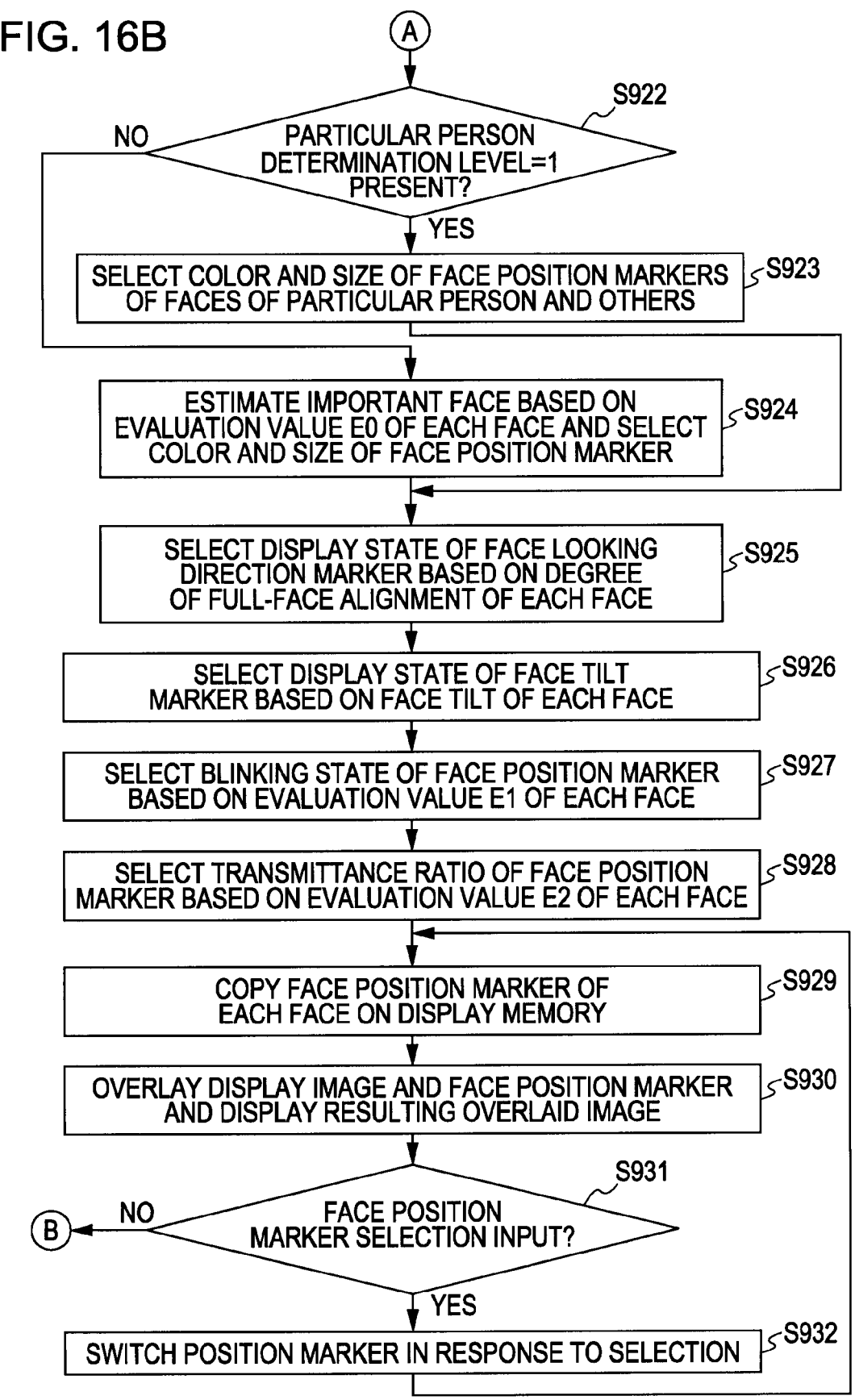
FIG. 16B is a continuation of the flowchart of FIG. 16A.

FIGS. 16A and 16B are flowcharts illustrating a face position marker display process performed by the imaging apparatus 100.

In accordance with one embodiment of the present invention, the imaging apparatus 100 overlaps the face position marker on the image photographed by the image pickup device 120. Steps S910 through S921 and S929 are related to a face detection process and steps S922 through S928 and S930 are related to a display process of the face position marker based on the face detection result.

The imaging apparatus 100 receives an image photographed by the image pickup device 120 (step S910). Upon receiving the photographed image from the image pickup device 120, the face detector 200 detects a face from the input image and calculates an evaluation value of the detected face (step S911). The face detector 200 determines whether the displaying of the face position marker is enabled (step S912). If it is determined in step S912 that the displaying of the face position marker is disabled, it is not necessary to display the face position marker. Processing proceeds to step S910.

If it is determined in step S912 that the displaying of the face position marker is enabled, the face detector 200 determines whether a face has been detected from the photographed image (step S913). If it is determined in step S913 that no face has been detected from the image, it is not necessary to display any face position marker. Processing proceeds to step S910. If it is determined in step S913 that an face has been detected from the image, the facial expression detector 600 extracts one face from the detected faces (step S914).

The facial expression detector 600 determines the evaluation value E0 of the extracted face using equation (1) (step S915), determines focus and exposure evaluation value E1 using equation (2) (step S916), and determines the evaluation value E2 of the facial expression using equation (3) (step S917).

The facial expression detector 600 determines whether the extracted face matches the face of the particular person stored on the particular person database 654 (step S918). If it is determined in step S918 that the extracted face matches the particular person stored on the particular person database 654, "1" is stored as a particular person determination flag of the extracted face (step S919). If it is determined in step S918 that the extracted face fails to match the particular person stored on the particular person database 654, "0" is stored as a particular person determination flag of the extracted face (step S920).

It is determined whether all faces detected by the face detector 200 have been extracted (step S921). If it is determined in step S921 that all faces detected by the face detector 200 have not been extracted, processing proceeds to step S914 to repeat the above-described process to the remaining faces (steps S914-S920).

If it is determined in step S921 that all faces detected by the face detector 200 have been extracted, it is determined whether a face having "1" as the particular person determination flag is present among the faces detected by the face detector 200 (step S922). It is determined in step S922 that a face having "1" as the particular person determination flag is present among the faces detected by the face detector 200, that face is the face of the most important person. The color and line thickness of the face position marker of the face are selected (step S923). It is determined in step S922 that a face having "1" as the particular person determination flag is not present among the faces detected by the face detector 200, the face of the most important person is determined based on the evaluation value E0 of each face detected by the face detector 200. The color and line thickness of the face position marker of that face are selected (step S924).

The display mode of the face looking direction marker is selected based on the degree of full face of each face detected by the face detector 200 (step S925). The display mode of the face tilt marker is selected based on the degree of tilt of each face detected by the face detector 200 (step S926).

The blinking mode of the face position marker is selected based on the evaluation value E1 of each face detected by the face detector 200 (step S927). The transparency of the face position marker is selected based on the evaluation value E2 of each face detected by the face detector 200 (step S928). Through these processed, the face position marker, the face looking direction marker and the face tilt marker are generated.

The generated face position marker, face looking direction marker and face tilt marker are stored onto the image storage unit 140 (step S929). The image photographed by the image pickup device 120, the face position marker, the face looking direction marker and the face tilt marker stored on the image storage unit 140 are overlaid and then displayed on the display 161 (step S930).

It is determined whether a face position marker (of a face of a person) selected by the selection receiver 162 is present among face position markers displayed on the display 161 (step S931). If it is determined in step S931 that the face position marker selected by the selection receiver 162 is present, the face position marker selected by the selection receiver 162 and the other face position markers are displayed with the display mode thereof changed (step S932). Processing returns to step S929 to repeat steps S929 and subsequent steps.

If it is determined in step S931 that the face position marker selected by the selection receiver 162 is not present among the face position markers displayed on the display 161, processing returns to step S910 to repeat steps S910 and subsequent steps.

FIG. 17 is a flowchart illustrating a selection process of a transparency of each face position marker performed by the imaging apparatus 100. In the selection process as shown in FIGS. 10A and 10B, the transparency of the displayed face position marker is successively varied in response to a change in the degree of smiling face displayed on the display 161. The selection process is described with respect to step S917 of FIG. 16A.

From the faces detected from the input image by the face detector 200, one face is extracted (step S941). Both eyes are extracted from the extracted face from the left eye database and right eye database 651 (step S942). The extracted eyes are position aligned and then the extracted face is resized to a size appropriate for determination (step S943). The degree of smiling face is determined with respect to the extracted face based on the smiling face database 652 (step S944).

The eye blinking face is determined with respect to the extracted face (step S945). The reciprocal of the degree of eye blinking is then determined as the degree of avoiding eye blinking. The degree of eye blinking and degree of avoiding eye blinking thus obtained are mapped to each face and then stored (step S946).

The evaluation value E2 of the facial expression of each face is determined based on the degree of eye blinking and degree of avoiding eye blinking thus obtained (step S947). It is determined whether all faces detected by the face detector 200 are extracted (step S948). If it is determined in step S948 that any one of the faces detected by the face detector 200 remains to be extracted, processing returns to step S941 to repeat steps S941 and subsequent steps.

If it is determined in step S948 that all faces detected by the face detector 200 are extracted, the transparency of the face position marker is selected based on the evaluation value E2 of each face detected by the face detector 200 (step S949).

One modification of the embodiment of the present invention is described below with reference to FIG. 18.

Figure 18:
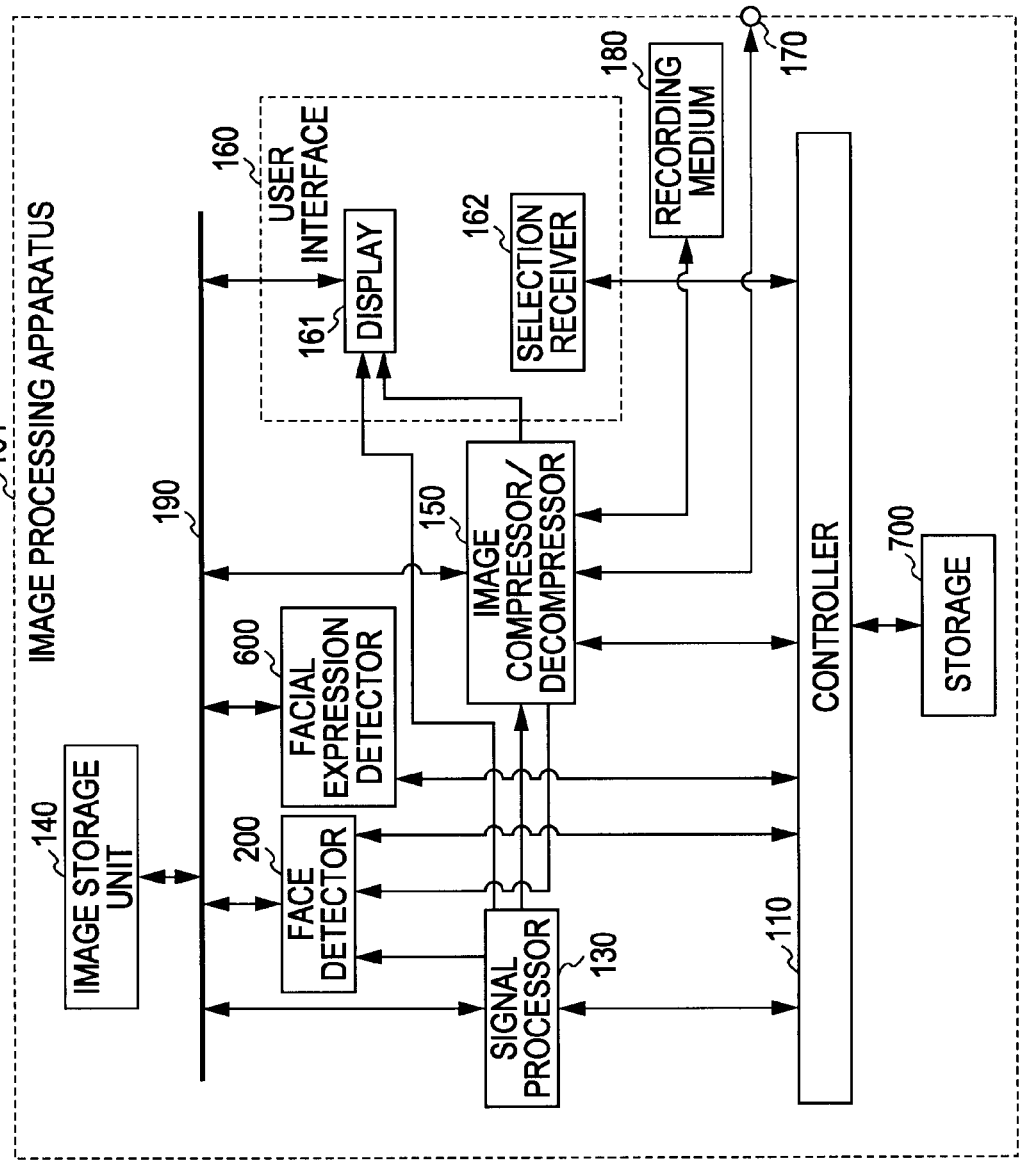
FIG. 18 is a functional block diagram illustrating an image processing apparatus as a modification of the imaging apparatus.

FIG. 18 is a functional block diagram illustrating an image processing apparatus 101 as one modification of the imaging apparatus 100. The image processing apparatus 101 may be an image recording and reproducing apparatus such as a personal computer and a video recorder.

The image processing apparatus 101 includes the controller 110, the signal processor 130, the image storage unit 140, the image compressor/decompressor 150, the user interface 160, the input-output terminal 170, the recording medium 180, the bus 190, the face detector 200, the facial expression detector 600 and the storage 700. The image processing apparatus 101 is identical in structure to the imaging apparatus 100 except that the image pickup device 120 and the vibration sensor 710 are eliminated. Like elements are identified with like reference numerals, and the discussion thereof is omitted.

During a play operation of the image processing apparatus 101, the image compressor/decompressor 150 receives an image signal and image incidental information from the recording medium 180. The image signal, if compressed, is decompressed by the image compressor/decompressor 150. The decompressed image signal is then output to the face detector 200. If a face is detected by the face detector 200, the face with a face position marker attached thereto is displayed on the display 161. If the image signal is input from the outside, the image signal and the image incidental information are input to the image compressor/decompressor 150 from the external device via the input-output terminal 170.

The face detection result detected by the face detector 200 is added to or updates the image signal input as the image incidental information input via the controller 110. The resulting information is recorded together with the image signal on the recording medium 180 again. If the image signal is input from the outside, the image signal and the image incidental information are output to the external device for storage via the input-output terminal 170.

In accordance with embodiments of the present invention, the variety of information based on the evaluation value relating to the faces detected by the face detector 200 is displayed as the face position marker correctly in an easy-to-see manner. The user can easily and quickly recognize the content of the variety of information. When a plurality of faces are displayed on the display 161, one of the imaging apparatus 100 and the image processing apparatus 101 automatically determines the major person. Furthermore, the user can manually select a desired face from among the plurality of faces. In combination of the automatic selection and the manual selection, the apparatus and the user may perform subject recognition in an interactive manner.

The evaluation value of each face obtained as a result of the face detection process of the face detector 200 is overlaid as a face position marker on the display image. The user can thus know the evaluation value of the face together with the face.

If the face position marker is not necessary with no persons photographed, the displaying of the face position marker is enabled or disabled. The disabling of the displaying of the face position marker can thus be selected. This arrangement avoids displaying an unnecessarily complex image. Power required to perform the face detection process and to display the face detection result is thus saved.

The face position marker may be a drawing or a symbol such as one of a rectangular shape, an ellipsoidal shape, and a group of four points only at the four corners of a rectangular shape. The image is thus displayed with quality thereof maintained while convenience to the user is provided.

In response to a variety of evaluation values output by the face detector 200, the face position marker may be changed in one of the color thereof, the type of the line thereof, the thickness of the line thereof, the transparency thereof, the blinking state thereof, the luminance or color of the internal area and external area thereof. The user can thus easily recognize the face evaluation value.

The face position marker may be changed in response to the facial expression of the person as the subject. When the degree of smiling face is high, or when a plurality of persons are all unblinking, the face position marker notifies the user of that timing as a good photo opportunity. The user can photograph an appropriate scene at good timing.

The imaging apparatus 100 can easily know the best setting of focus and lens exposure from the display mode of the face position marker.

When a registered known person (particular person) is detected, the face position marker of the face of that person is displayed in a different display mode from the other face position markers. The user can easily identify the position of the particular person from among the plurality of persons.

The face looking direction marker accompanying the face position marker allows the user to recognize at a glance which direction the face looks.

The face tilt marker accompanying the face position marker allows the user to recognize at a glance at what tilt angle the face looks.

Since the rectangular face position marker is displayed with the upper side (the lower side, the left side and the right side) of the face different in color and thickness, the user can easily know how the face rotates and the rotation of the camera during photographing. The upper side, the lower side, the left side and the right side of the face are used to identify the portrait format, and an indication of the portrait format is displayed in the image. The user can easily know that the imaging apparatus 100 has captured the image with the portrait view angle.

When a plurality of faces are present in the image, the user can identify at a glance a face determined as a major person by one of the imaging apparatus 100 and the image processing apparatus 101. The user can freely select one as the major person from the plurality of display persons. The focusing and lens exposure control may be performed to that person. A person unregistered as a major person on the imaging apparatus 100 may be set as a major person by the user.

The imaging apparatus corresponds to the imaging apparatus 100.

The image pickup unit corresponds to the image pickup device 120.

The image input unit corresponds to the image input unit 810.

The face detecting unit corresponds to the face detector 200.

The face position marker generating unit corresponds to the face position marker generator 820.

The overlaying unit corresponds to the overlaying unit 830.

The display unit corresponds to the display 161.

The setting unit corresponds to the selection receiver 162.

The camera control value detecting unit corresponds to the controller 110.

The major person estimating unit corresponds to the facial expression detector 600.

The particular person storage unit corresponds to the particular person database 654. The particular person determining unit corresponds to the facial expression detector 600.

The image pickup status detecting unit corresponds to the facial expression detector 600.

The output unit corresponds to the input-output terminal 170.

The selecting unit corresponds to the selection receiver 162.

The output unit corresponds to the image output unit 840. The image processing apparatus corresponds to the image processing apparatus 101.

The step of inputting the image corresponds to step S910. The step of detecting the face corresponds to step S911. The step of generating the face position marker corresponds to step S929. The step of overlaying the face position marker corresponds to step S930. The step of outputting the overlaid image corresponds to step S930.

The process steps discussed in connection with the embodiments may be considered as a method, a program for causing a computer to execute the method, or a recording medium storing the program.

It should be understood by those skilled in the art that various modifications, combinations, sub-combinations and alterations may occur depending on design requirements and other factors insofar as they are within the scope of the appended claims or the equivalents thereof.

What is claimed is:
1. An imaging apparatus comprising:
an image pickup section configured to capture an image of a subject;

an image input section configured to input the image captured by the image pickup section;

a face detector configured to detect a face from the image input by the image input section;

a face position marker generator configured to generate a face position marker indicating a position of the face, detected by the face detector, in the image input by the image input section;

an overlaying section configured to overlay the face position marker generated by the face position marker generator and the image input by the image input section; and a display configured to display an image overlaid by the overlaying section, wherein if a plurality of faces are detected by the face detector in the image input by the image input section, the face position marker generator generates the face position marker so that the detected faces are different from each other in terms of a transparency of the face position marker.

2. An imaging apparatus comprising:

an image pickup section configured to capture an image of a subject;

a face detecting section configured to detect a face from the image captured by the image pickup section;

a face position marker generating section configured to generate a face position marker having an outline that surrounds the face detected by the face detecting section; and a display section configured to display the face position marker and the image captured by the image pickup section, wherein the display section displays one of an internal area and an external area of the outline of the face position marker with one of luminance and color thereof being modified from original luminance or original color of the image.

3. The imaging apparatus according to claim 2, wherein the display section is further configured to modify only the external area of the outline of the face position marker in color or in color saturation level.

4. The imaging apparatus according to claim 2, wherein the display section is further configured to modify only the internal area of the outline of the face position marker in color or color saturation level.

5. An imaging apparatus comprising:

an image pickup section configured to capture an image of a subject;

an image input section configured to input the image captured by the image pickup section;

a face detector configured to detect a face from the image input by the image input section and further detect a variety information relating to the face detected;

a face position marker generator configured to generate a face position marker based on the variety of information relating to the face, the face position maker indicating a position of the face detected by the face detector, in the image input by the image input section;

an overlaying section configured to overlay the face position marker generated by the face position marker generator and the image input by the image input section; and a display configured to display an image overlaid by the overlaying section, wherein the variety of information relating to the face is a degree of an expression of the face and the face position marker varies in accordance with the degree of the expression of the face.

6. An imaging apparatus comprising:

an image pickup section configured to capture an image of a subject;

a face detecting section configured to detect a face from the image captured by the image pickup section;

a face position marker generating section configured to generate a face position marker that indicates a position of the face detected by the face detecting section;

a display section configured to display the face position marker and the image captured by the image pickup section; and a camera control value detecting section configured to detect a degree of focusing or a degree of lens exposure matching, relating to the face, wherein the face position marker generating section is further configured to modify the face position marker based on the degree of focusing or the degree of lens exposure matching detected by the camera control value detecting section.

7. An imaging apparatus comprising:

an image pickup section configured to capture an image of a subject;

a face detecting section configured to detect a face from the image captured by the image pickup section;

a face position marker generating section configured to generate a face position marker that indicates a position of the face detected by the face detecting section;

a display section configured to display the face position marker and the image captured by the image pickup section;

a memory that stores information relating to a face of a particular person; and a determining section configured to determine whether a face detected by the face detecting section matches the face of the particular person stored in the memory, wherein the face position marker generating section is further configured to generate a different face position marker for the face which matches the face of the particular person stored in the memory, the different face position marker being discriminated from face position markers of other persons that do not match the face of the particular person stored in the memory.

8. An imaging apparatus comprising:

an image pickup section configured to capture an image of a subject;

an image input section configured to input the image captured by the image pickup section;

a face detector configured to detect a face from the image input by the image input section;

a face position marker generator configured to generate a face position marker indicating a position of the face, detected by the face detector, in the image input by the image input section;

an overlaying section configured to overlay the face position marker generated by the face position marker generator and the image input by the image input section; and a display configured to display an image overlaid by the overlaying section, wherein the face position marker generator is further configured to generate a face looking direction marker in a vicinity of the face position marker of the face in response to a direction of the face if the face detected by the face detector looks in one of an upward direction, a downward direction, a leftward direction and a rightward direction, and wherein the overlaying section is further configured to overlay the face position marker, generated by the face position marker generator, and the face looking direction marker on the image input by the image input section.

9. An imaging apparatus comprising:
an image pickup section configured to capture an image of a subject;
an image input section configured to input the image captured by the image pickup section;
a face detector configured to detect a face from the image input by the image input section;
a face position marker generator configured to generate a face position marker indicating a position of the face, detected by the face detector, in the image input by the image input section;
an overlaying section configured to overlay the face position marker generated by the face position marker generator and the image input by the image input section; and
a display configured to display an image overlaid by the overlaying section,
wherein the face position marker generator is further configured to generate a face tilt marker to be displayed in a vicinity of the face position marker of the face in response to a tilt angle if the face detected by the face detector is tilted as a result of a rolling action, and
wherein the overlaying section is further configured to overlay the face position marker and the face tilt marker, generated by the face position marker generator, on the image input by the image input section.

10. An imaging apparatus comprising:
an image pickup section configured to capture an image of a subject;
a face detecting section configured to detect a face from the image captured by the image pickup section;
a face position marker generating section configured to generate a face position marker that indicates a position of the face detected by the face detecting section;
a display section configured to display the face position marker and the image captured by the image pickup section,
wherein the face position marker indicates an upper side of the face detected by the face detecting section.

11. An imaging apparatus comprising:
an image pickup section configured to capture an image of a subject;
an image input section configured to input the image captured by the image pickup section;
a face detector configured to detect a face from the image input by the image input section;
a face position marker generator configured to generate a face position marker indicating a position of the face, detected by the face detector, in the image input by the image input section;
an overlaying section configured to overlay the face position marker generated by the face position marker generator and the image input by the image input section; and
a display configured to display an image overlaid by the overlaying section,
wherein the face position marker generator is further configured to generate a particular position marker as a face position marker indicating one of an upper position, a lower position, a left position and a right position in the face detected by the face detector, the particular position marker being displayed on or in the vicinity of the face position marker, and
wherein the overlaying section is further configured to overlay the face position marker and the particular position marker, generated by the face position marker generator, on the image input by the image input section.

12. The imaging apparatus according to claim 11, further comprising an image pickup status detector configured to detect an image pickup status with a portrait view angle, based on the particular position marker generated by the face position marker generator,
wherein if the image pickup status detector has detected the image pickup status with a portrait view angle, the display displays an indication indicating that the image pickup status with a portrait view angle has been detected, together with the particular position marker generated by the face position marker generator in the image overlaid by the overlaying section.

13. The imaging apparatus according to claim 12, further comprising an output section configured to output, to a recording medium, image incidental information indicating that the image pickup status with a portrait view angle has been detected, together with the image overlaid by the overlaying section, if the image pickup status detector has detected the image pickup status with a portrait view angle.

14. An image processing apparatus comprising:
an image input section configured to input an image;
a face detector configured to detect a face from the image input by the image input section;
a face position marker generator configured to generate a face position marker indicating a position of the face, detected by the face detector, in the image input by the image input section;
an overlaying section configured to overlay the face position marker generated by the face position marker generator and the image input by the image input section; and
a display configured to display an image overlaid by the overlaying section,
wherein if a plurality of faces are detected by the face detector in the image input by the image input section, the face position marker generator generates the face position marker so that the detected faces are different from each other in terms of a transparency of the face position marker.

15. An image processing apparatus comprising:
a face detecting section configured to detect a face from an input image;
a face position marker generating section configured to generate a face position marker having an outline that surrounds the face detected by the face detecting section; and
a display section configured to display the face position marker and the input image, wherein the display section displays one of an internal area and an external area of the outline of the face position marker with one of luminance and color thereof being modified from original luminance or original color of the image.

16. An image processing apparatus comprising:
an image input section configured to input an image;
a face detector configured to detect a face from the image input by the image input section and further detect a variety information relating to the face detected;
a face position marker generator configured to generate a face position marker based on the variety of information relating to the face, the face position maker indicating a position of the face detected by the face detector, in the image input by the image input section;
an overlaying section configured to overlay the face position marker generated by the face position marker generator and the image input by the image input section; and
a display configured to display an image overlaid by the overlaying section,
wherein the variety of information relating to the face is a degree of expression of the face and the face position marker varies in accordance with the degree of the expression of the face.

17. An image processing apparatus comprising:
a face detecting section configured to detect a face from an input image;
a face position marker generating section configured to generate a face position marker that indicates a position of the face detected by the face detecting section;
a display section configured to display the face position marker and the input image; and
a camera control value detecting section configured to detect a degree of focusing or a degree of lens exposure matching, relating to the face,
wherein the face position marker generating section is further configured to modify the face position marker based on the degree of focusing or the degree of lens exposure matching detected by the camera control value detecting section.

18. An image processing apparatus comprising:
a face detecting section configured to detect a face from an input image;
a face position marker generating section configured to generate a face position marker that indicates a position of the face detected by the face detecting section;
a display section configured to display the face position marker and the input image;
a memory that stores information relating to a face of a particular person; and
a determining section configured to determine whether a face detected by the face detecting section matches the face of the particular person stored in the memory,
wherein the face position marker generating section is further configured to generate a different face position marker for the face which matches the face of the particular person stored in the memory, the different face position marker being discriminated from face position markers of other persons that do not match the face of the particular person stored in the memory.

19. An image processing apparatus comprising:
an image input section configured to input an image;
a face detector configured to detect a face from the image input by the image input section;
a face position marker generator configured to generate a face position marker indicating a position of the face, detected by the face detector, in the image input by the image input section;
an overlaying section configured to overlay the face position marker generated by the face position marker generator and the image input by the image input section; and
a display configured to display an image overlaid by the overlaying section,
wherein the face position marker generator is further configured to generate a face looking direction marker in the vicinity of the face position marker of the face in response to a direction of the face if the face detected by the face detector looks in one of an upward direction, a downward direction, a leftward direction and a rightward direction, and
wherein the overlaying section is further configured to overlay the face position marker, generated by the face position marker generator, and the face looking direction marker on the image input by the image input section.

20. An image processing apparatus comprising:
an image input section configured to input an image;
a face detector configured to detect a face from the image input by the image input section;
a face position marker generator configured to generate a face position marker indicating a position of the face, detected by the face detector, in the image input by the image input section;
an overlaying section configured to overlay the face position marker generated by the face position marker generator and the image input by the image input section; and
a display configured to display an image overlaid by the overlaying section,
wherein the face position marker generator is further configured to generate a face tilt marker to be displayed in a vicinity of the face position marker of the face in response to a tilt angle if the face detected by the face detector is tilted as a result of a rolling action, and
wherein the overlaying section is further configured to overlay the face position marker and the face tilt marker, generated by the face position marker generator, on the image input by the image input section.

21. An image processing apparatus comprising:
a face detecting section configured to detect a face from an input image;
a face position marker generating section configured to generate a face position marker that indicates a position of the face detected by the face detecting section;
a display section configured to display the face position marker and the input image,
wherein the face position marker indicates an upper side of the face detected by the face detecting section.

22. An image processing apparatus comprising:
an image input section configured to input an image;
a face detector configured to detect a face from the image input by the image input section;
a face position marker generator configured to generate a face position marker indicating a position of the face, detected by the face detector, in the image input by the image input section;
an overlaying section configured to overlay the face position marker generated by the face position marker generator and the image input by the image input section; and
a display configured to display an image overlaid by the overlaying section,
wherein the face position marker generator is further configured to generate a particular position marker as a face position marker indicating one of an upper position, a lower position, a left position and a right position in the face detected by the face detector, the particular position marker being displayed on or in the vicinity of the face position marker, and
wherein the overlaying section is further configured to overlay the face position marker and the particular position marker, generated by the face position marker generator, on the image input by the image input section.

* * * * *